United States Patent
Lee et al.

(10) Patent No.: US 8,463,317 B2
(45) Date of Patent: Jun. 11, 2013

(54) MOBILE TERMINAL AND METHOD OF CONTROLLING THE OPERATION OF THE MOBILE TERMINAL

(75) Inventors: Jinyong Lee, Seoul (KR); Jaeseo Kim, Seoul (KR); Ilhee Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 217 days.

(21) Appl. No.: 12/948,439

(22) Filed: Nov. 17, 2010

(65) Prior Publication Data

US 2011/0117955 A1   May 19, 2011

(30) Foreign Application Priority Data

| Nov. 17, 2009 | (KR) | 10-2009-0111082 |
| Nov. 18, 2009 | (KR) | 10-2009-0111613 |
| Dec. 9, 2009 | (KR) | 10-2009-0121913 |
| Dec. 30, 2009 | (KR) | 10-2009-0134376 |

(51) Int. Cl.
*H04W 88/02* (2009.01)

(52) U.S. Cl.
USPC ........................................ 455/550.1; 345/102

(58) Field of Classification Search
USPC .................... 455/550.1; 320/101; 345/102
See application file for complete search history.

(56) References Cited

U.S. PATENT DOCUMENTS

| 2004/0253976 A1* | 12/2004 | Lin ........................... 455/550.1 |
| 2005/0179638 A1* | 8/2005 | Seo et al. ...................... 345/102 |
| 2007/0262948 A1* | 11/2007 | Han et al. ...................... 345/102 |
| 2009/0058353 A1* | 3/2009 | Jung ............................. 320/101 |
| 2009/0225020 A1* | 9/2009 | Ran et al. ...................... 345/102 |
| 2009/0261743 A1* | 10/2009 | Chen et al. .................... 315/192 |

* cited by examiner

*Primary Examiner* — David Q Nguyen
(74) *Attorney, Agent, or Firm* — Birch, Stewart, Kolasch & Birch, LLP

(57) ABSTRACT

A mobile terminal and a method of controlling the operation of the mobile terminal are provided. The method includes performing color sensing of a first color using a color sensor of the mobile terminal and recognizing a second color which corresponds to the first color; and providing an output based on the second color. The mobile terminal includes a main body; a color sensor configured to perform color sensing of a first color; a controller configured to recognize a second color which corresponds to the first color; and an output unit configured to provide an output that is based on the second color. Therefore, it is possible to change the color of the mobile terminal into a variety of colors by driving the lighting module in accordance with color data generated by the color sensor.

18 Claims, 28 Drawing Sheets

(a)          (b)

(a)　　　　　　　　(b)

(a)         (b)

MOBILE TERMINAL AND METHOD OF CONTROLLING THE OPERATION OF THE MOBILE TERMINAL

CROSS-REFERENCE TO RELATED APPLICATION

This application claims priority to and the benefit of Korean Patent Application No. 10-2009-0111082, filed on Nov. 17, 2009, No. 10-2009-0111613, filed on Nov. 18, 2009, No. 10-2009-0121913, filed on Dec. 9, 2009, and No. 10-2009-0134376, filed on Dec. 30, 2009 in the Korean Intellectual Property Office, the disclosures of which are incorporated herein by reference.

BACKGROUND OF THE INVENTION

1. Field of the Invention

Embodiments of the present invention relate to a mobile terminal and a method of controlling an operation of the mobile terminal, and more particularly, to a mobile terminal capable of rendering various colors using color data provided by a color sensor and a method of controlling the operation of the mobile terminal.

2. Description of the Related Art

Mobile terminals are portable devices capable of performing voice/video calls, inputting and outputting information, and/or storing data. As functions of mobile terminals diversify, an increasing number of mobile terminals have been able to perform various complicated functions, such as capturing photos and/or moving images, playing music files and moving image files, providing games, receiving broadcast programs, and providing wireless Internet services, and have thus evolved into multifunctional multimedia players.

Various attempts have recently been made to implement a variety of complicated functions in mobile terminals such as providing a user interface (UI) environment for allowing users to search for and choose desired functions with ease. Further, mobile terminals are nowadays considered as personal belongings that represent users' personality, and thus, demand for change in the design of mobile terminals has steadily grown. Therefore, the color and design of mobile terminals have often been determined based on preferences and behavior of specific customer groups.

However, once the color and design of mobile terminals are determined, they can never be changed again even though the color of mobile terminals does not match properly with the surroundings of the mobile terminals or is so similar to the ambient color that the mobile terminals can become difficult to locate.

SUMMARY OF THE INVENTION

The present invention provides a mobile terminal capable of changing or correcting (adjusting) its color appropriately for its operating environment based on color data provided by a color sensor.

According to an aspect of the present invention, there is provided a method of controlling the operation of a mobile terminal, the method including generating color data corresponding to an ambient color of a main body of the mobile terminal with the use of a color sensor disposed in the main body; determining an output color based on the color data; and preparing a lighting module, which emits light, in the main body and driving the lighting module to emit light having the output color.

According to another aspect of the present invention, there is provided a mobile terminal including a main body; a lighting module configured to be disposed in the main body and emit light; a color sensor configured to generate color data corresponding to an ambient color of the main body; and a controller configured to determine an output color based on the color data and drive the lighting module to emit light having the output color.

According to another aspect of the present invention, there is provided a method of controlling the operation of a mobile terminal, the method including switching from a standby mode to a predefined operating mode; sensing an ambient color of a main body of the mobile terminal with the use of a color sensor disposed in the main body and determining a color having a color difference greater than a reference level from the sensed ambient color as an output color; and preparing a lighting module, which emits light, in the main body and driving the lighting module to emit light having the output color.

According to another aspect of the present invention, there is provided a mobile terminal including a main body; a lighting module configured to be disposed in the main body and emit light; a color sensor configured to sense an ambient color of the main body; and a controller configured to determine a color having a color difference greater than a reference level from the sensed ambient color as an output color and drive the lighting module to emit light having the output color.

According to another aspect of the present invention, there is provided a method of controlling the operation of a mobile terminal, the method including connecting a video call to a counterpart mobile terminal; sensing the skin tone of a user with the use of a color sensor, comparing the sensed skin tone with a reference skin tone and generating a skin tone-corrected video call image of the user in which the skin tone of the user is corrected in accordance with the results of the comparison; and transmitting the skin tone-corrected video call image to the counterpart mobile terminal during the video call with the counterpart mobile terminal.

According to another aspect of the present invention, there is provided a mobile terminal including a wireless communication unit configured to connect a video call to a counterpart mobile terminal; a color sensor configured to sense the skin tone of a user; and a controller configured to compare the sensed skin tone with a reference skin tone, generate a skin tone-corrected video call image of the user in which the skin tone of the user is corrected in accordance with the results of the comparison, and transmit the skin tone-corrected video call image to the counterpart mobile terminal during the video call with the counterpart mobile terminal.

According to another aspect of the present invention, there is provided a method of controlling the operation of a mobile terminal, the method including generating an input image by capturing an image of a subject; detecting a color from the input image; and generating an audio signal indicating the detected colors and outputting the audio signal.

According to another aspect of the present invention, there is provided a mobile terminal including a camera configured to generate an input image by capturing an image of a subject; a controller configured to detect a color from the input image and generate an audio signal corresponding to the detected color; and an output unit configured to output the audio signal.

According to another aspect of the present invention, there is provided a method of controlling the operation of a mobile terminal, the method including displaying a communication window showing in real time data currently being transmitted between the mobile terminal and a counterpart mobile terminal; receiving ambient lighting information from the counterpart mobile terminal; and changing the color of the communication window based on the ambient lighting information.

According to another aspect of the present invention, there is provided a mobile terminal including a display module configured to display a communication window showing in real time data currently being transmitted between the mobile terminal and a counterpart mobile terminal; a wireless communication unit configured to receive ambient lighting information from the counterpart mobile terminal; and a controller configured to change the color of the communication window based on the ambient lighting information.

According to another aspect of the present invention, there is provided a method of controlling the operation of a mobile terminal, the method including connecting a video call to a counterpart mobile terminal; correcting a video call image based on CCT information provided by the counterpart mobile terminal; and transmitting the corrected video call image to the counterpart mobile terminal during the video call with the counterpart mobile terminal.

According to another aspect of the present invention, there is provided a mobile terminal including a wireless communication unit configured to connect a video call to a counterpart mobile terminal; and a controller configured to correct a video call image based on CCT information provided by the counterpart mobile terminal and control the wireless communication unit to transmit the corrected video call image to the counterpart mobile terminal during the video call with the counterpart mobile terminal.

According to another aspect of the invention, there is provided a method of controlling an operation of a mobile terminal, including performing color sensing of a first color using a color sensor of the mobile terminal and recognizing a second color which corresponds to the first color; and providing an output based on the second color.

According to another aspect of the invention, there is provided a method of controlling an operation of a mobile terminal including connecting a video call to a counterpart mobile terminal; receiving ambient lighting information from the counterpart mobile terminal and adjusting an output of the mobile terminal based on the received ambient lighting information; and transmitting a video call image to the counterpart mobile terminal.

According to another aspect of the invention, there is provided a mobile terminal including a main body; a color sensor configured to perform color sensing of a first color; a controller configured to recognize a second color which corresponds to the first color; and an output unit configured to provide an output that is based on the second color.

BRIEF DESCRIPTION OF THE DRAWINGS

The above and other features and advantages of the present invention will become more apparent by describing in detail example embodiments thereof with reference to the attached drawings in which.

DETAILED DESCRIPTION OF THE INVENTION

The present invention will hereinafter be described in detail with reference to the accompanying drawings in which example embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
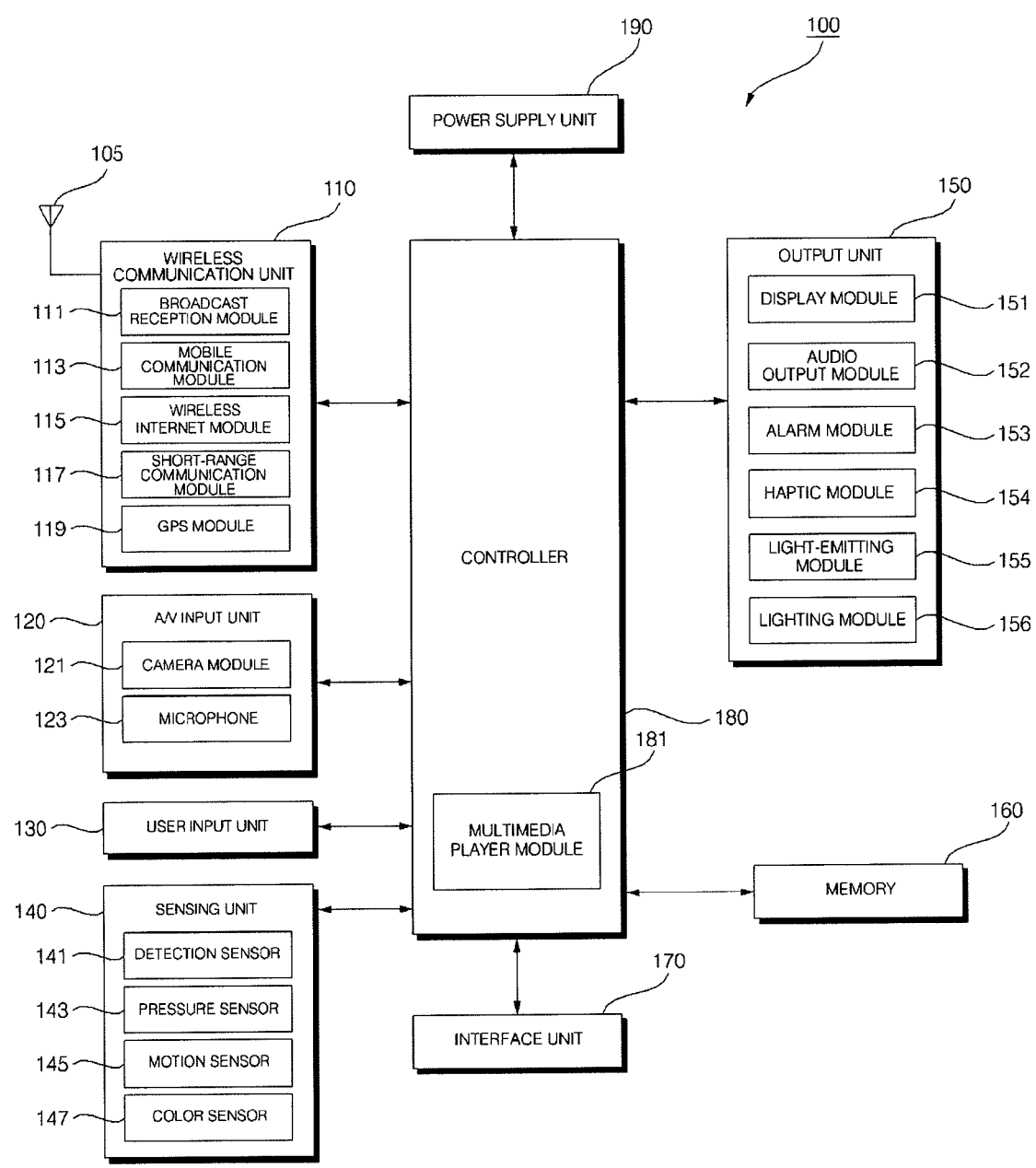
FIG. 1 illustrates a block diagram of a mobile terminal according to an example embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140 the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive at least one of a broadcast signal and broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this instance, the broadcast-related information may be received by the mobile communication module 113, rather than by the broadcast reception module 111. The broadcast-related information may come in various forms.

The broadcast reception module 111 may receive the broadcast signal using various broadcasting systems. In addition, the broadcast reception module 111 may be configured to be suitable for nearly all types of broadcasting systems other than those set forth herein. The broadcast signal or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device. The wireless internet module 115 may use various wireless internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone 123. The camera module 121 may process various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may receive a command or information by being pushed or touched by a user of the mobile terminal 100. The user input unit 130 may be implemented as a keypad, a dome switch, a static pressure or capacitive touch pad, a jog wheel, a jog switch, joystick, or a finger mouse. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with the user of the mobile terminal 100, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a detection sensor 141, a pressure sensor 143, a motion sensor 145 and a color sensor 147. The detection sensor 141 may determine whether there is an object nearby and approaching the mobile terminal 100 without any mechanical contact with the entity. More specifically, the detection sensor 141 may detect an object that is nearby and approaching by detecting a change in an alternating magnetic field or the rate of change of static capacitance. The sensing unit 140 may include two or more detection sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this instance, it is possible to differentiate a typical touch input from a pressure touch input, which is generated using a higher pressure level than that used to generate a typical touch input, based on data provided by the pressure sensor 143. In addition, when a pressure touch input is received through the display module

151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles, to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The color sensor 147 is a type of optical sensor sensing a predetermined wavelength band included in white light. More specifically, the color sensor 147 may be an application of a semiconductor light-receiving device and may detect colors, which are a type of signal information. The color sensor 147 may sense the color of light emitted from a photodiode coated with blue, green and red filters and may output the result of the sensing as a voltage, a frequency or a digital or analog signal.

The output unit 150 may output audio signals, video signals and alarm signals. The output unit 150 may include the display module 151, an audio output module 152, an alarm module 153, and a haptic module 154, a light-emitting module 155 and a lighting module 156.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used not only as an output device but also as an input device capable of receiving information in response to a touch input made by the user of the mobile terminal 100.

If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user of the mobile terminal 100. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module and an internal display module.

The audio output module 152 may output audio data received by the wireless communication unit 110 during a call reception mode, a call mode, a recording mode, a voice recognition mode, or a broadcast reception mode or may output audio data present in the memory 160. In addition, the audio output module 152 may output various sound signals associated with the functions of the mobile terminal 100 such as receiving a call or a message. The audio output module 152 may include a speaker and a buzzer.

The alarm module 153 may output an alarm signal indicating the occurrence of an event in the mobile terminal 100. Examples of the event include receiving a call signal, receiving a message, and receiving a key signal. Examples of the alarm signal output by the alarm module 153 include an audio signal, a video signal and a vibration signal. More specifically, the alarm module 153 may output an alarm signal upon receiving a call signal or a message. In addition, the alarm module 153 may receive a key signal and may output an alarm signal as feedback to the key signal. Therefore, the user of the mobile terminal 100 may be able to easily recognize the occurrence of an event based on an alarm signal output by the alarm module 153. An alarm signal for notifying the user of the mobile terminal 100 of the occurrence of an event may be output not only by the alarm module 153 but also by the display module 151 or the audio output module 152.

The haptic module 154 may provide various haptic effects (such as vibration) that can be perceived by the user of the mobile terminal 100. If the haptic module 154 generates vibration as a haptic effect, the intensity and the pattern of vibration generated by the haptic module 154 may be altered in various manners. The haptic module 154 may synthesize different vibration effects and may output the result of the synthesization. Alternatively, the haptic module 154 may sequentially output different vibration effects.

The haptic module 154 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 154 may be configured to enable the user of the mobile terminal 100 to recognize a haptic effect using the kinesthetic sense of the fingers or the arms. The mobile terminal 100 may include two or more haptic modules 157.

The light-emitting module 155 may include a matrix array of a plurality of light-emitting devices (such as light-emitting diodes (LEDs), and may display various shapes and patterns under the control of the controller 180.

The lighting module 156 may use a light-emitting device such as an LED as a light source, and may include a lighting tube irradiating light emitted from the light-emitting device. The entire lighting module 156 or only a part of the lighting module 156 may irradiate light under the control of the controller 180.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia player module 181, which plays multimedia data. The multimedia player module 181 may be implemented as a hardware device and may be installed in the controller 180. Alternatively, the multimedia player module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior structure of the mobile terminal 100 will hereinafter be described in detail with reference to FIGS. 2 through 4. For convenience, assume that the mobile terminal 100 is a folder-type mobile terminal. However, the present invention is not restricted to a folder-type mobile terminal. Rather, the present invention can be applied to various mobile phones, other than a folder-type mobile terminal.

Figure 2:
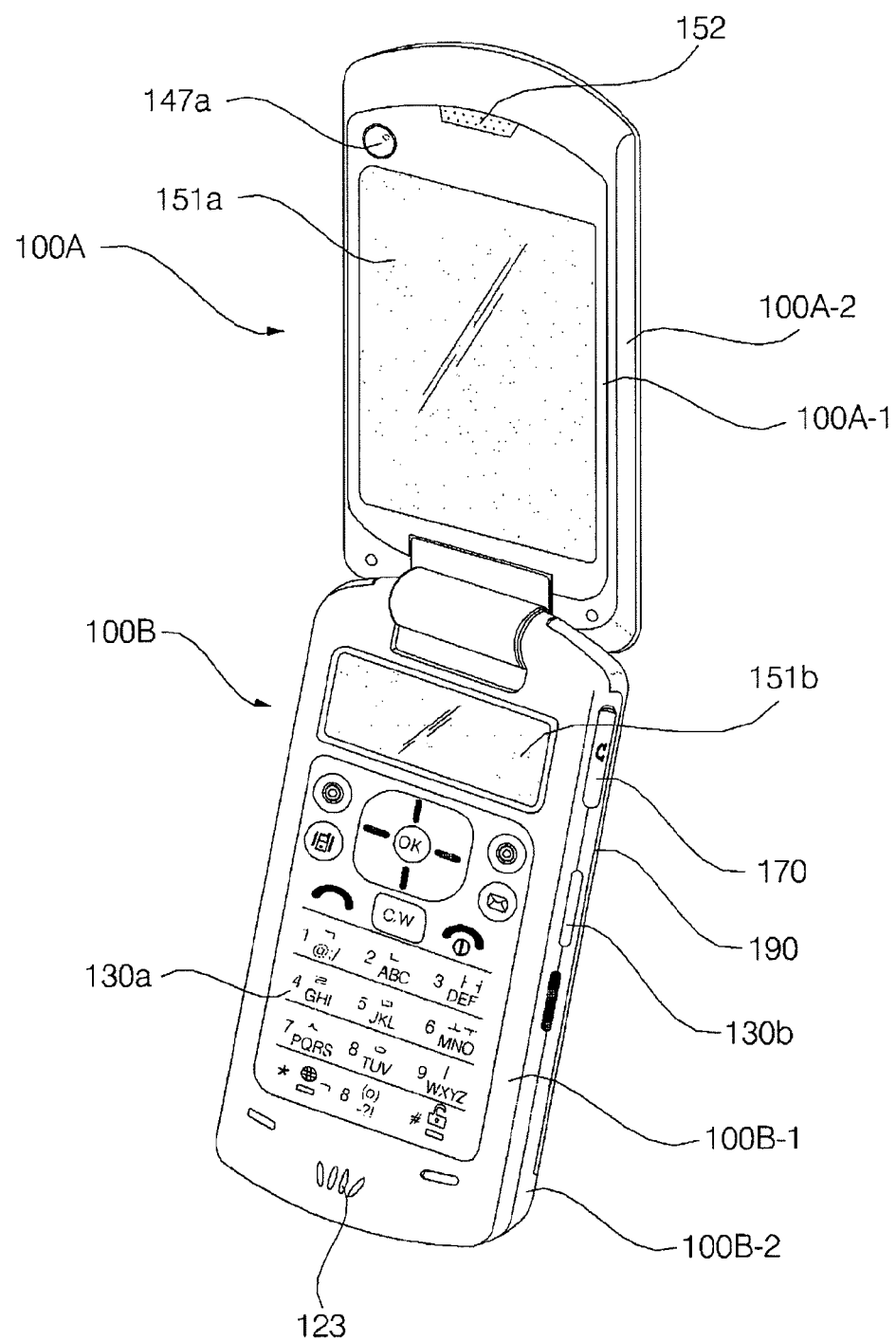
FIGS. 2 through 4 illustrate perspective views of the mobile terminal shown in FIG. 1.
Figure 3:
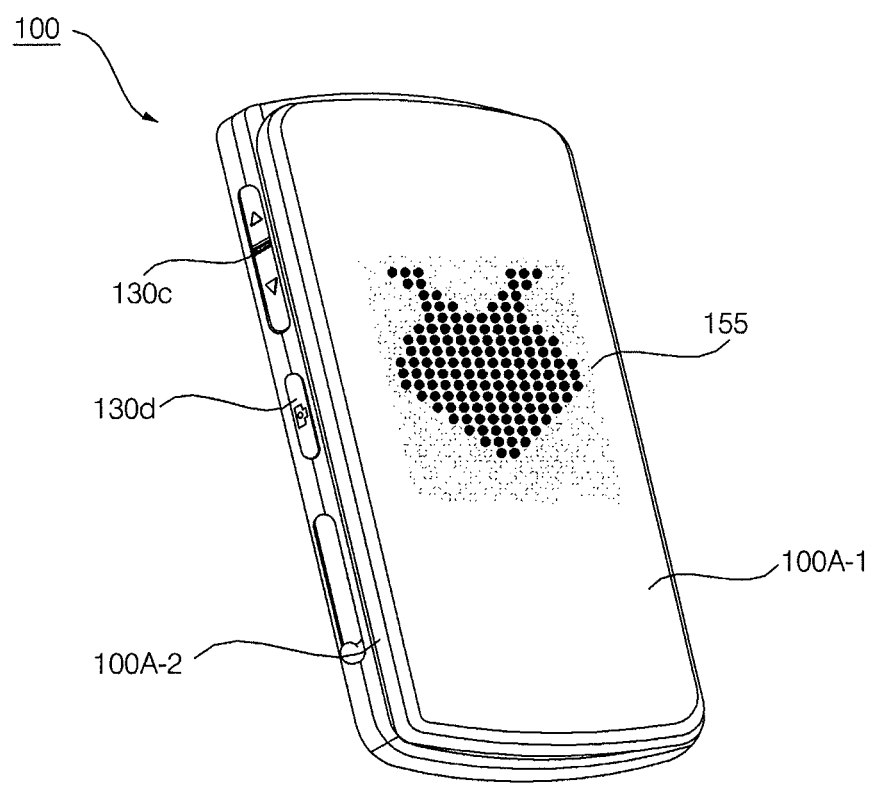

Referring to FIGS. 2 and 3, the mobile terminal 100 may include a first body 100A and a second body 100B which is hinged on the first body 100A so as to be able to rotate.

Referring to FIG. 2, when the first and second bodies 100A and 100B are opened up to their maximum extent, the mobile terminal 100 is referred to as being in an open configuration. On the other hand, referring to FIG. 3, when the first body 100A is shut and thus overlaps the second body 100B, the mobile terminal 100 is referred to as being in a closed configuration.

When the mobile terminal 100 is in the closed configuration, the mobile terminal 100 may generally operate in a standby mode, and may be released from the standby mode in response to user manipulation. On the other hand, when the mobile terminal 100 is in the open configuration, the mobile terminal 100 may generally operate in a call mode, and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one middle case may be additionally provided between the first front case 100A-1 and the first rear case 100A-2 in an embodiment of the present invention. The first front case 100A-1, the first rear case 100A-2 and the middle case may be formed of synthetic resin through injection molding. Alternatively, the first front case 100A-1, the first rear case 100A-2 and the middle case may be formed of a metallic material, for example, stainless steel (STS) or titanium (Ti).

A first display 151a, the audio output module 152, and a first camera 121a may be provided at the front of the first rear case 100A-2. The exterior of the second body 100B may be defined by a second front case 100B-1 and a second rear case 100B-2. A second display 151b and a first user input module 130a may be provided in the second body 100B, and particularly, at the front of the second front case 100B-1.

Each of the first and second displays 151a and 151b may include an LCD or an OLED capable of displaying information. If a touch pad is laid over the first and second displays 151a and 151b so as to form a layer structure, the first and second displays 151a and 151b may be able to serve as touch screens capable of allowing the user of the mobile terminal 100 to enter various information in a touch-based manner. The audio output module 152 may be implemented as a receiver or a speaker. The first camera 121a may be configured to be able to capture a still or moving image, for example, of the user of the mobile terminal 100.

The second user input module 130b, the microphone 123 and the interface unit 170 may be disposed in the second front case 100B-1 or the second rear case 100B-2. The first and second user input modules 130a and 130b and third and fourth user input modules 130c and 130d may be collectively referred to as the user input unit 130. The user input unit 130 may adopt various manipulation methods, and may be able to provide tactile feedback to the user of the mobile terminal 100.

The user input unit 130 may be implemented as a dome switch or a touch pad capable of receiving various commands or information by being pushed or touched. Alternatively, the user input unit 130 may be implemented as a wheel, a jog shuttle or a joystick.

The first user input module 130a may allow the user of the mobile terminal 100 to enter various commands (such as 'start', 'end', and 'scroll') and to select an operating mode, and the second through fourth user input modules 130b and 130d may be used as hot keys for activating certain functions.

The color sensor 147 may include first and second color sensors 147a and 147b. The first color sensor 147a may sense the color of the surroundings of the mobile terminal 100, and may output the results of the sensing as color data. The microphone 123 may be configured to properly receive the voice of the user of the mobile terminal 100 or other sounds.

The light-emitting module 155 may be disposed in the first front case 100A-1. The light-emitting module 155 may include a matrix array of light-emitting devices such as LEDs. The light-emitting module 155 may generate a single color or multiple colors according to the type of light-emitting devices included therein. The light-emitting module 155 may be driven using a static or dynamic driving method.

The static driving method is characterized by preparing a number of shift registers corresponding to the number of light-emitting devices included in the light-emitting module 155 and turning on or off all the light-emitting devices included in the light-emitting module 155 at the same time with the use of the shift registers.

The dynamic driving method, which is similar to a display method of a cathode ray tube (CRT), is characterized by scanning and turning on or off a plurality of rows of light-emitting devices included in the light-emitting module 155 one by one. The dynamic driving method offers lower brightness than the static driving method and may result in blinking of the light emitting devices, especially at low scan frequencies. However, the dynamic driving method can simplify the structure of a driving circuitry of the light emitting devices.

Figure 4:
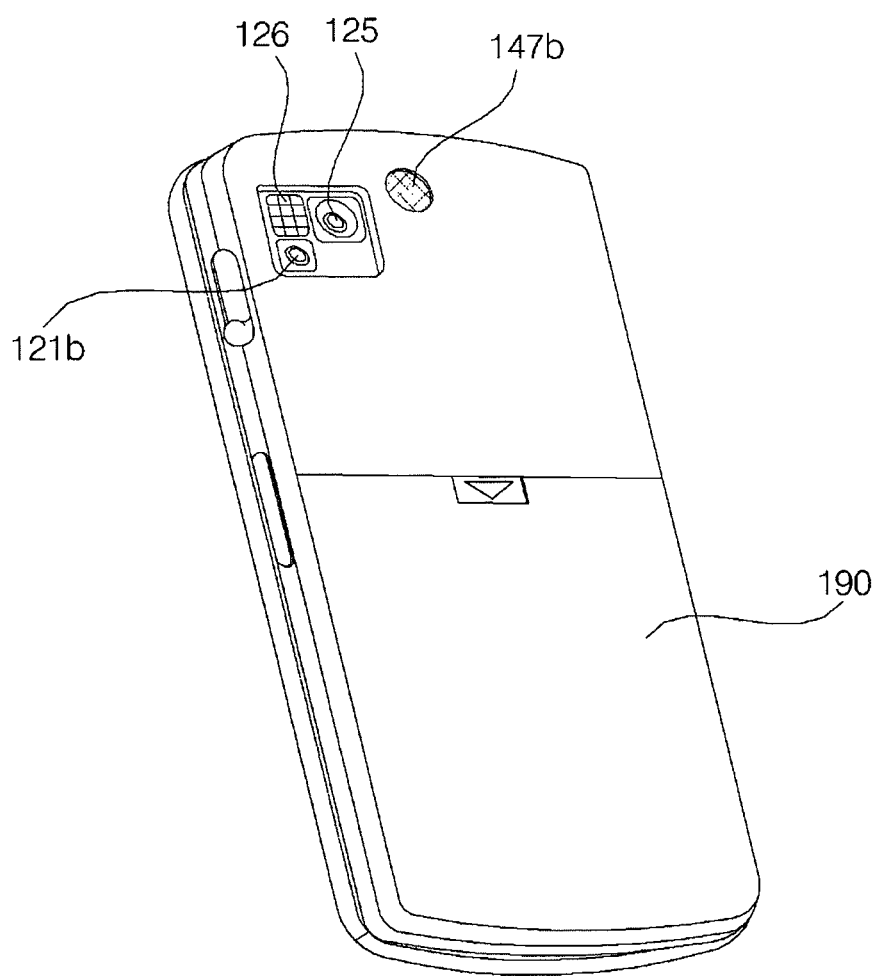

Referring to FIG. 4, a second camera 121b may be additionally provided at the rear of the second rear case 100B-2 of the second body 100B. The second camera 121b may have a different photographing direction from that of the first camera 121a discussed with respect to FIG. 2. In addition, the first and second cameras 121a and 121b may have different resolutions. For example, the first camera 121a may be used to capture and then transmit an image of the face of the user of the mobile terminal 100 during a video call. Thus, a low-resolution camera may be used as the first camera 121a. The second camera 121b may be used to capture an image of an ordinary subject, object, or a scene. In this instance, the image captured by the second camera 121b may not need to be transmitted. Thus, a high-resolution camera may be used as the second camera 121b.

A camera flash 126 and a mirror 125 may be disposed near the second camera 121b. The camera flash 126 may be used to illuminate a subject when the user of the mobile terminal 100 attempts to capture an image of the subject with the second camera 121b. The mirror 125 may be used for the user of the mobile terminal 100 to prepare him- or herself for taking a self shot.

The second color sensor 147b may be additionally provided in the second rear case 100B-2. The color sensor 147, for example, the first color sensor 147a and the second color sensor 147b, may sense ambient colors and may thus output the results of the sensing, i.e., color data. An antenna for receiving a broadcast signal may additionally be provided on one side of the second rear case 100B-2. The antenna may be installed so as to be able to be pulled out of the second rear case 100B-2.

The second camera 121b, the antenna, and the camera flash 126, which have been described as being provided in the second rear case 100B-2, may be provided in the first body 100A, and particularly, in the first rear case 100A-2. The first camera 121a may be configured to be rotatable and thus to cover the photographing direction of the second camera 121b. In this instance, the second camera 121b may be optional.

The power supply unit 190 may be disposed in the second rear case 100B-2. The power supply unit may be a rechargeable battery and may be coupled to the second rear case 100B-2 so as to be attachable to or detachable from the second rear case 100B-2.

Figure 5:
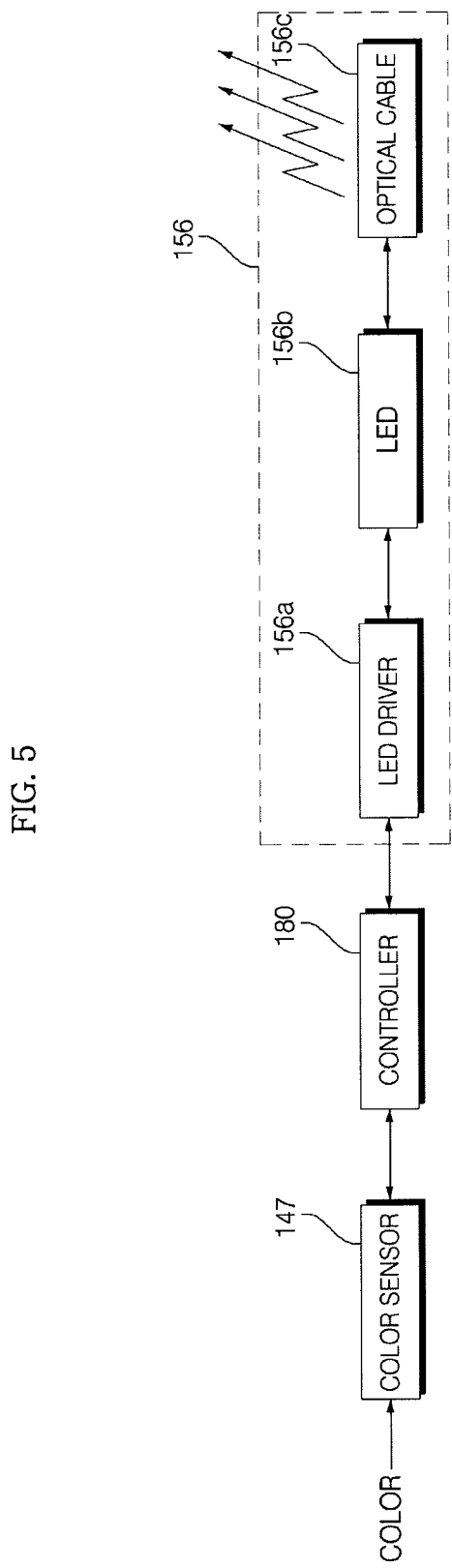
FIG. 5 illustrates a block diagram of a lighting module shown in FIG. 1.

FIG. 5 illustrates a block diagram of the lighting module 156. Referring to FIG. 5, the lighting module 156 may include an LED driver 156a, an LED 156b and an optical cable 156c.

The lighting module 156 may use the LED 156b as a light source, and may emit light generated by the LED 156b through the optical cable 156c. The lighting module 156 may emit light of various colors under the control of the controller 180.

More specifically, the color sensor 147 may sense the color of its surroundings, may generate color data corresponding to the results of the sensing, and may provide the color data to the controller 180. The controller 180 may transmit control data to the LED driver 156a in order for the lighting module 156 to emit light having a color specified by the color data. The LED driver 156a may drive the LED 156b in response to the receipt of the control data. As a result, light emitted by the LED 156b may be output through the optical cable 156c. In this manner, it is possible to generate and emit light of various colors.

Figure 6:
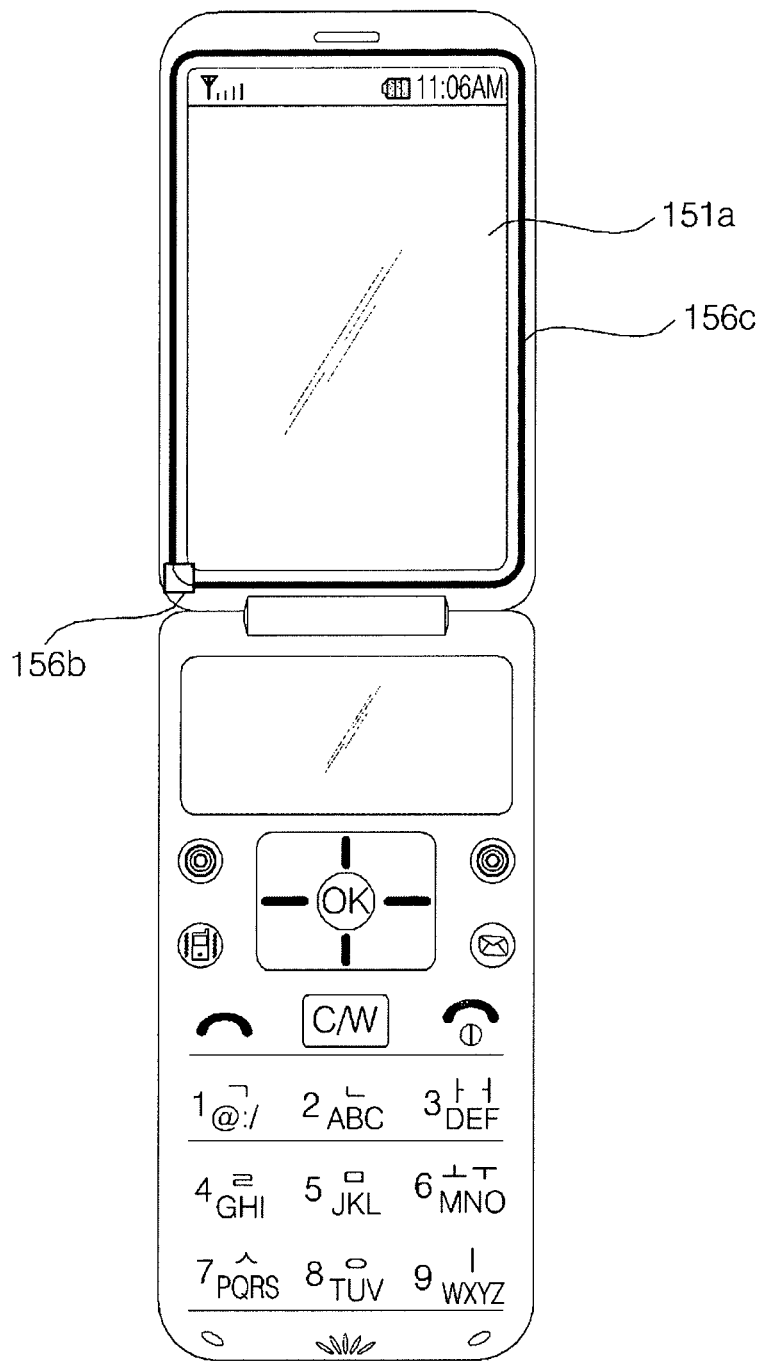
FIGS. 6 through 9 illustrate diagrams of various examples of the arrangement of the lighting module in the mobile terminal shown in FIG. 1.
Figure 7:
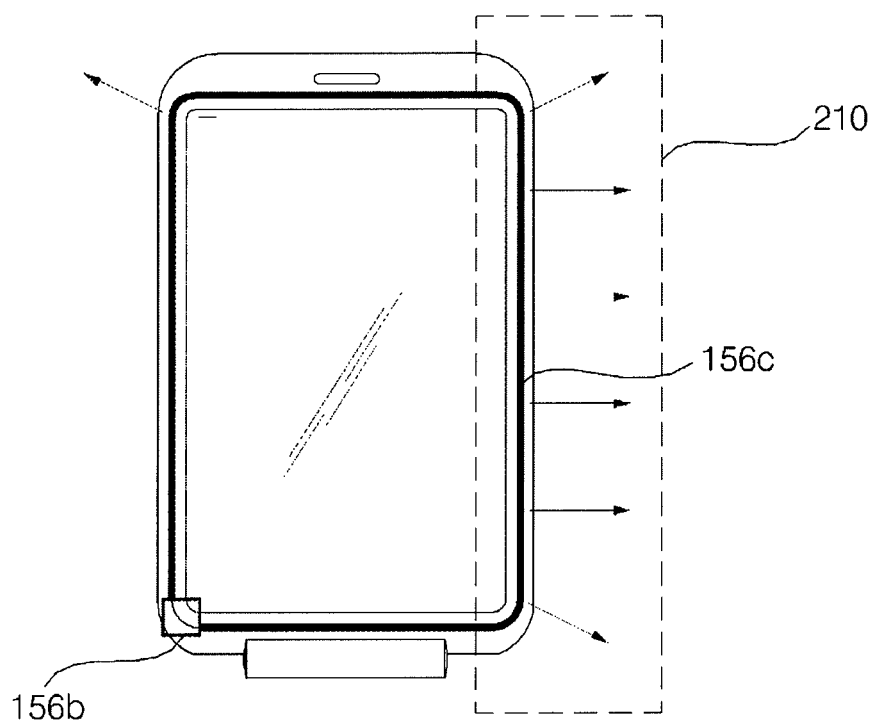

FIGS. 6 through 9 illustrate diagrams of various examples of the arrangement of the lighting module 156. Referring to FIG. 6, the lighting module 156 may be disposed along the sides of the first display 151a. More specifically, the first display 151a may be surrounded by a transparent case, and the lighting module 156 may be disposed in the transparent case along the sides of the first display 151a as shown by the LED 156b and the optical cable 156c. Thus, the color of the sides of the first display 151a may be changed in accordance with the color of the surroundings of the mobile terminal 100 and a current operating mode of the mobile terminal 100. Referring to FIG. 7, one or more holes may be formed on the optical cable 156c, and thus, the lighting module 156 may be able to emit light in any desired direction, as indicated by reference numeral 210 and the arrows.

Figure 8:
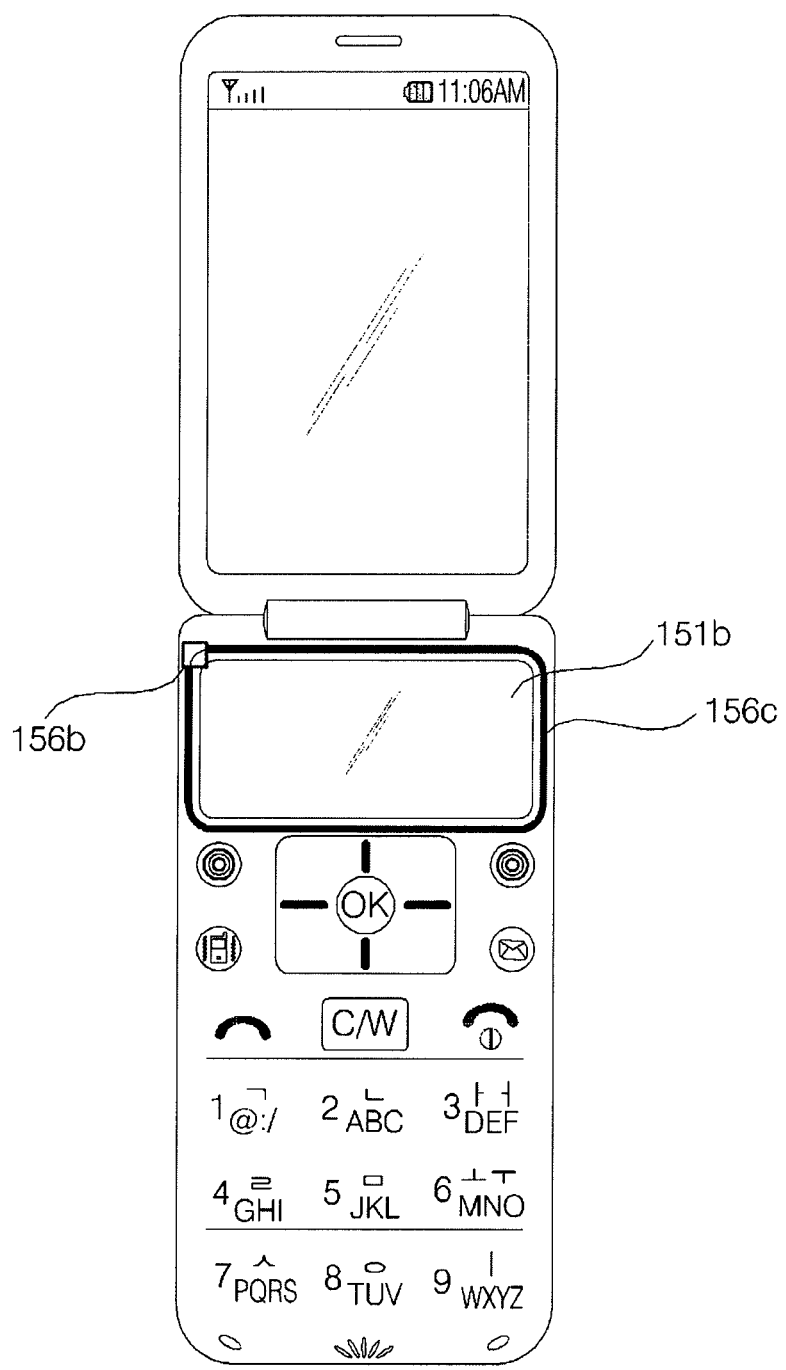
Figure 9:
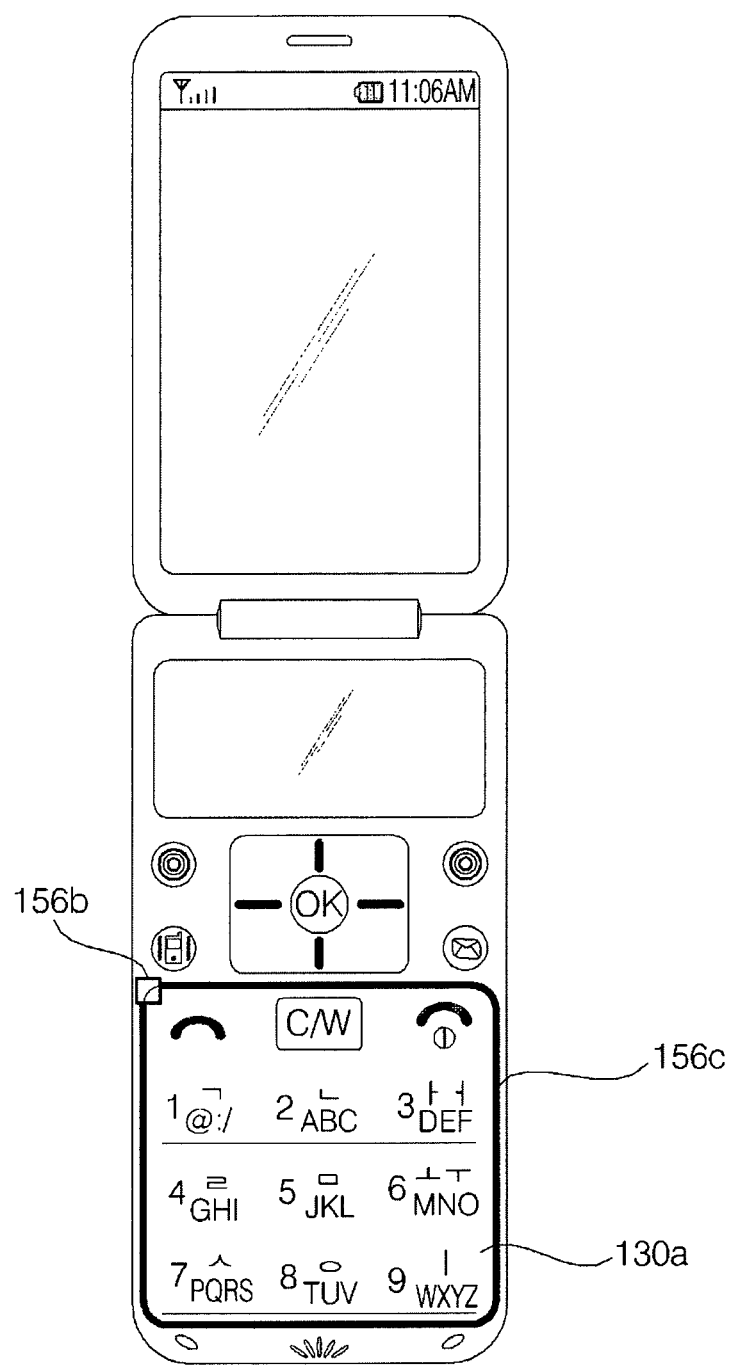

Alternatively, referring to FIG. 8, the lighting module 156 may be disposed along the sides of the second display 151b as shown by the LED 156b and the optical cable 156c. Still alternatively, referring to FIG. 9, the lighting module 156 may be disposed along the sides of the first user input module 130a as shown by the LED 156b and the optical cable 156c.

In short, referring to FIGS. 6 through 9, the lighting module 156 (as shown by the LED 156b and the optical cable 156c) may be disposed at various locations in the mobile terminal 100 and may thus emit light of various colors in accordance with the color, for example, of the surroundings of the mobile terminal 100 and/or a current operating mode of the mobile terminal 100. By using a transparent case, it is possible to arbitrarily change the color of any portion of the mobile terminal 100.

Not only the lighting module 156 but also the light-emitting module 155 may be controlled to emit light having a predetermined color specified by color data provided by the color sensor 147.

Figure 10:
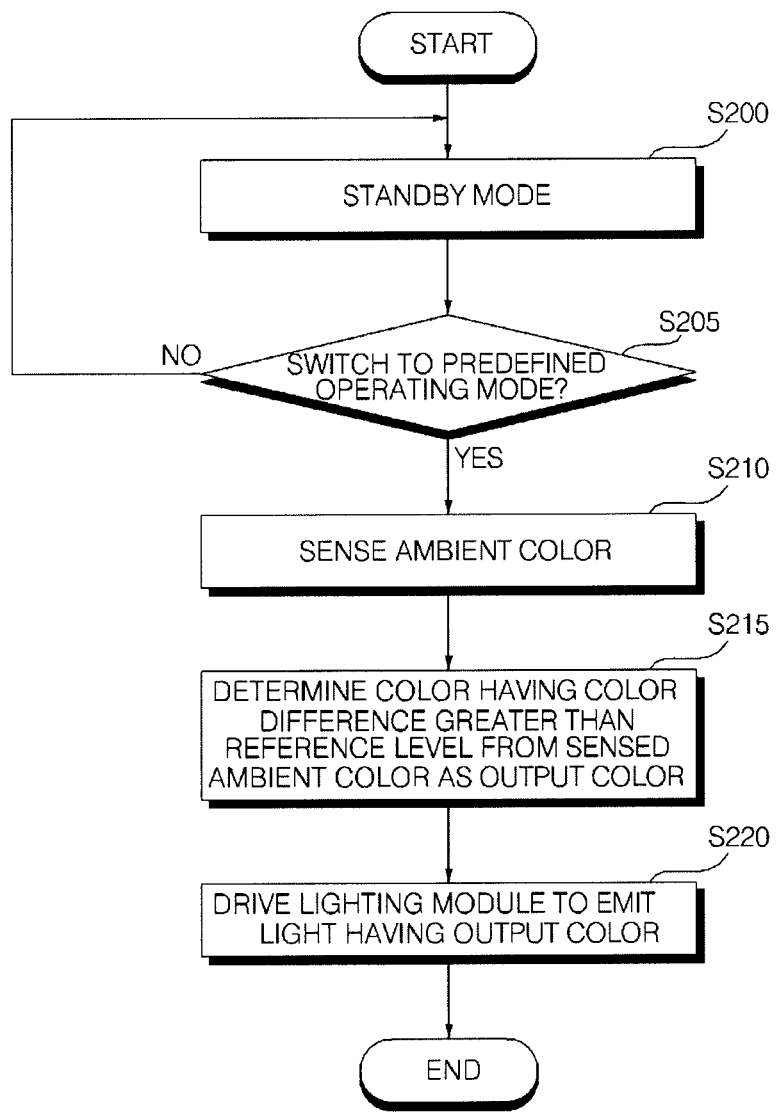
FIG. 10 illustrates a flowchart of a method of controlling the operation of a mobile terminal according to a first example embodiment of the present invention.

FIG. 10 illustrates a flowchart of a method of controlling the operation of a mobile terminal according to a first example embodiment of the present invention. Referring to FIG. 10, if no user input is detected for more than a predefined amount of time or if no event occurs for more than a predefined amount of time, the mobile terminal 100 may enter an idle (standby) mode (S200). During the idle mode, the mobile terminal 100 may exchange signals with a base station with the display module 151 turned off.

Thereafter, if an event such as receiving a call, a message, or an email occurs, the mobile terminal 100 may be switched to a predetermined (predefined) operating mode corresponding to the occurred event (S205). Then, the controller 180 may sense the color of the surroundings (or ambient color) of the mobile terminal 100 with the use of the color sensor 147 (S210). The color sensor 147 may sense the color of the surroundings of the mobile terminal 100 and may transmit color data (such as correlated color temperature (CCT) data) corresponding to the results of the sensing to the controller 180. As a result, the controller 180 can determine the color of the surroundings of the mobile terminal 100 based on the color data.

Thereafter, the controller 180 may determine an output color, which is the color of light to be output from the lighting module 156, based on the color data (S215). The output color may be a color having a color difference of more than a predefined reference level from the color of the surroundings of the mobile terminal 100, or may be the complementary color of the color of the surroundings of the mobile terminal 100. That is, the controller 180 may select a color that can be clearly distinguished from the color of the surroundings of the mobile terminal 100 as the output color. Such output color may be a determined color having a difference greater than a reference level from sensed ambient color as the output color.

Thereafter, the controller 180 may drive the lighting module 156 to emit light having the output color (S220). The color of the light emitted by the lighting module 156 may be changed at regular intervals of time.

In this manner, it is possible for the mobile terminal 100 to emit light that can be clearly distinguished from the color of the surroundings of the mobile terminal 100. When the lighting module 156 is disposed in a transparent case, the color of the mobile terminal 100 may be changed easily so as to be distinguishable from the surroundings of the mobile terminal 100, and thus, the user of the mobile terminal 100 can easily locate the mobile terminal 100.

The color of the surroundings of the mobile terminal 100 may be sensed using at least one of the first and second color sensors 147a and 147b, which are disposed in the first and second bodies 100A and 100B, respectively. Then, the output color may be determined based on at least one of an ambient color sensed at the front of the mobile terminal 100 and an ambient color sensed at the rear of the mobile terminal 100. For example, if the amount of ambient light near the mobile terminal 100 is greater than a reference level, the output color may be determined based on the ambient color sensed at the front of the mobile terminal 100. On the other hand, the amount of ambient light near the mobile terminal 100 is less than the reference level, the output color may be determined based on the ambient color sensed at the rear of the mobile terminal 100.

The controller 180 may decide whether the keypad of the mobile terminal 100 should emit light by determining the amount of ambient light using at least one of the first and second color sensors 147a and 147b. In this instance, there is no need to additionally provide an ambient light sensor.

The color(s) of image data displayed on the display module 151 may be appropriately corrected or emphasized based on ambient colors sensed by the color sensor 147 in consideration that the image data may become less visible in certain places (such as very bright or very dark scenes) than it normally is.

The color(s) of image data displayed on the display module 151 may be distorted due to the CCT of ambient light so that, for example, blue appears to be dominant in the image data under red light. In order to address this problem, ambient CCT may be measured using the color sensor 147, and the image data may be corrected based on the results of the measurement using a white balance control algorithm. That is, in order to properly view an image where blue is dominant under red light, the color of the display module 151 may be turned into red, thereby making the image to appear sharper and more vivid. In this manner, it is possible for the user of the mobile terminal 100 to properly view various images displayed on the display module 151 without being affected by the CCT of ambient light. The above-mentioned color correction may also be performed on broadcast screens or video call screens, or displayed on the display module 151.

Figure 11:
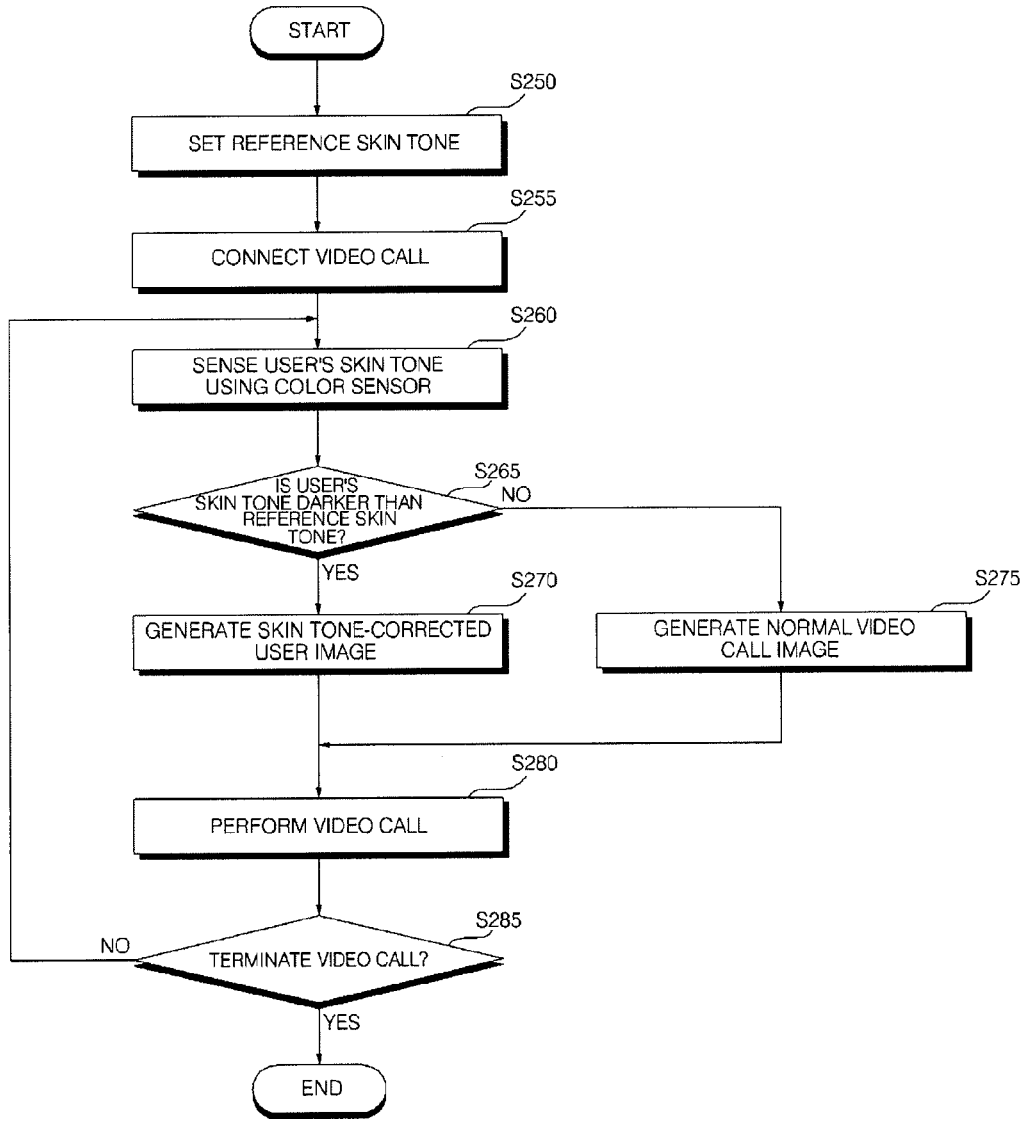
FIG. 11 illustrates a flowchart of a method of controlling the operation of a mobile terminal according to a second example embodiment of the present invention.

FIG. 11 illustrates a flowchart of a method of controlling the operation of a mobile terminal according to a second example embodiment of the present invention. Referring to FIG. 11, a reference skin tone for use in comparison with other skin tones sensed by the color sensor 147 may be set (S250). Information regarding the reference skin tone may be stored in the memory 160. The reference skin tone may be set arbitrarily by the user of the mobile terminal 100. A menu for setting or changing the reference skin tone may be additionally provided.

Thereafter, if a request for making a video call is issued in accordance with a user command, the controller 180 may control the wireless communication unit 110 to make or connect a video call to a counterpart mobile terminal (S255).

Thereafter, the controller 180 may sense the skin tone of the user of the mobile terminal 100 with the use of the color sensor 147 (S260). Thereafter, the controller 180 may determine whether the skin tone of the user of the mobile terminal 100 is darker (or different) than the reference skin tone (S265). If the skin tone of the user of the mobile terminal 100 is darker (or different) than the reference skin tone, the controller 180 may generate a skin tone-corrected video call image in which the skin tone of the user of the mobile terminal 100 is corrected in accordance with the reference skin tone (S270). On the other hand, if the skin tone of the user of the mobile terminal 100 is not darker (or different) than the reference skin tone, the controller 180 may generate a normal (or non-corrected) video call image (S275).

Thereafter, the controller 180 may control the video call image generated in operation S270 or 5275 to be used during a video call with the counterpart mobile terminal (S280). During the video call with the counterpart mobile terminal, the video call image generated in operation S270 or S275 and a video call image sent by the counterpart mobile terminal may both be displayed on the display module 151, and audio data provided by the counterpart mobile terminal may be output via the audio output module 152.

Operations S260 through S280 may be performed repeatedly until the user of the mobile terminal 100 chooses to terminate the video call (S285).

In short, the controller 180 can determine the ambient lighting conditions by sensing the skin tone of the user of the mobile terminal 100 with the use of the color sensor 147. Thereafter, the controller 180 may transmit a skin tone-corrected video call image in which the skin tone of the user of the mobile terminal 100 is corrected in accordance with the reference skin tone to the counterpart mobile terminal and may thus enhance the presentability of the video call image of the user of the mobile terminal 100.

If the user of the mobile terminal 100 participates in a video call, for example, wearing a hat, a part of the face of the user of the mobile terminal 100 shaded by the hat may appear to be darker in a video call image than the rest of the face of the user of the mobile terminal 100. In this instance, the video call image may be corrected only for the shaded part of the face of the user of the mobile terminal 100, rather than for the whole face of the user of the mobile terminal 100.

During a video call with the counterpart mobile terminal, the mobile terminal 100 may be provided with detailed color information regarding a video call image provided by the counterpart mobile terminal. More specifically, if the user of the mobile terminal 100 touches a part of the video call image provided by the counterpart mobile terminal, the mobile terminal 100 may transmit the coordinates of the touched part of the video call image to the counterpart mobile terminal. Then, the counterpart mobile terminal may identify which part of the video call image has been touched by the user of the mobile terminal 100 based on the coordinates transmitted by the mobile terminal 100, may perform color sensing on the touched part of the video call image using a color sensor, and may provide color data corresponding to the results of the color sensing to the mobile terminal 100.

Figure 12:
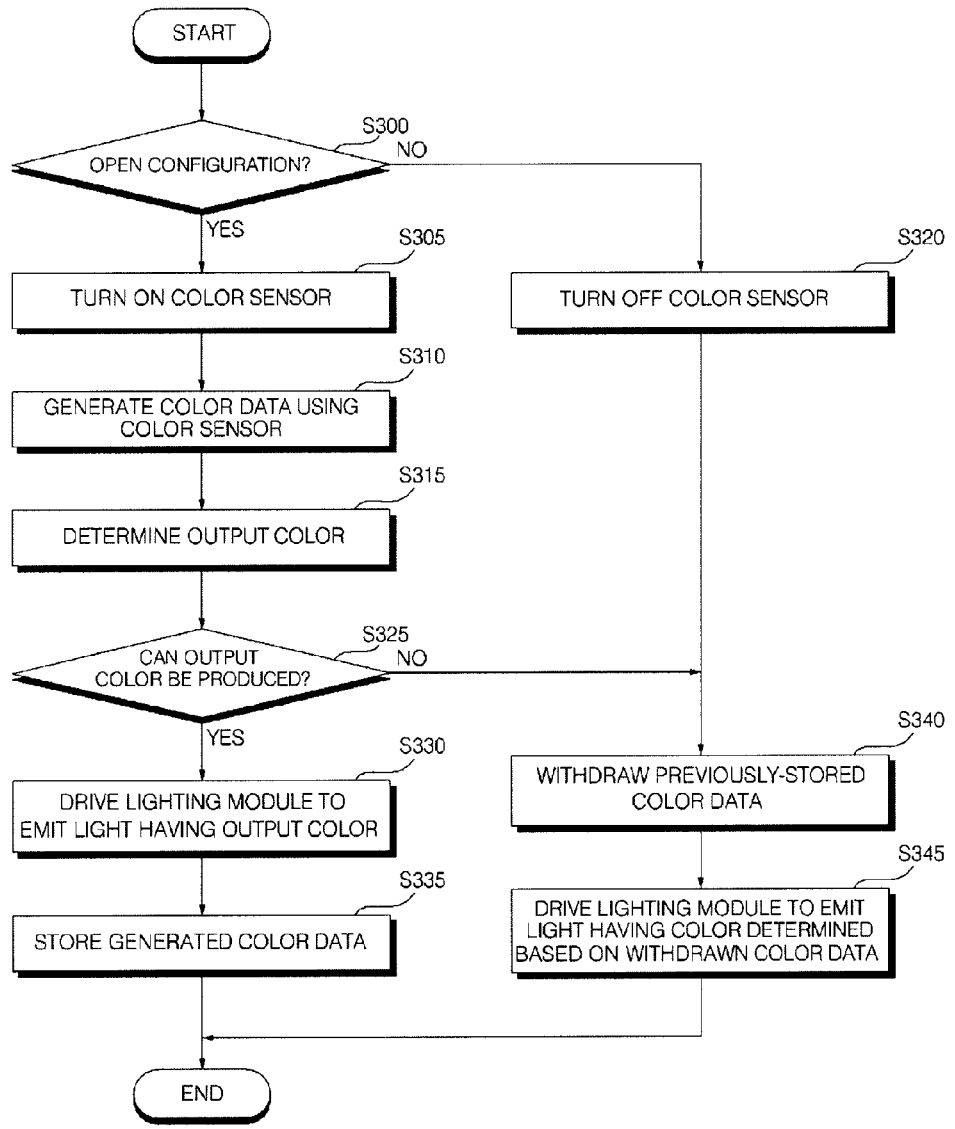
FIG. 12 illustrates a flowchart of a method of controlling the operation of a mobile terminal according to a third example embodiment of the present invention.

FIG. 12 illustrates a flowchart of a method of controlling the operation of a mobile terminal according to a third example embodiment of the present invention. Referring to FIG. 12, if the mobile terminal 100 is placed in the open configuration by opening the first and second bodies 100A and 100B, for example, to their maximum extent (S300), the color sensor 147 may be turned on (S305). Then, the color sensor 147 may sense the color of the surroundings of the mobile terminal 100 and may generate color data such as CCT data based on the results of the sensing (S310). Thereafter, the color sensor 147 may transmit the color data to the controller 180.

Thereafter, the controller 180 may determine an output color based on the color data (S315). The output color may be the same as the color of the surroundings of the mobile terminal 100 or may be a complementary color of the color of the surroundings of the mobile terminal 100. Alternatively, the output color may be a color selected in consideration of a current operating mode of the mobile terminal 100 and the color of the surroundings of the mobile terminal 100, or other factors.

Thereafter, the controller 180 may determine whether the output color can be produced by the lighting module 156 (S325). If it is determined in operation S325 that the output color cannot be produced by the lighting module 156, the method proceeds to operation S340. On the other hand, if it is determined in operation S325 that the output color can be produced by the lighting module 156, the controller 180 may drive the lighting module 156 to emit light having the same color as the output color (S330). The color of the light emitted by the lighting module 156 may be changed periodically. Thereafter, the controller 180 may store the color data of the output color in the memory 160 (S335).

On the other hand, if the mobile terminal 100 is placed in the closed configuration (i.e., not placed in the open configuration) (S300), the controller 180 may terminate the operation of the color sensor 147 (S320). Thereafter, the controller 180 may withdraw (or obtain) color data from the memory 160 (S340), and may drive the lighting module 156 to output light having the same color as a color specified by the withdrawn (or obtained) color data (S345). That is, the controller 180 may drive the lighting module 156 with the use of color data present in the memory 160 or otherwise obtained, not only when the output color determined in operation S315 cannot be produced by the lighting module 156 but also when the color of the surroundings of the mobile terminal 100 cannot be sensed, when predetermined, or when selected by a user.

In this manner, it is possible to emit light having the same color as the color of the surroundings of the mobile terminal 100 by using the color sensor 147. In addition, it is possible to arbitrarily change the color of the mobile terminal 100 by encapsulating the lighting module 156 in a transparent case.

Figure 13:
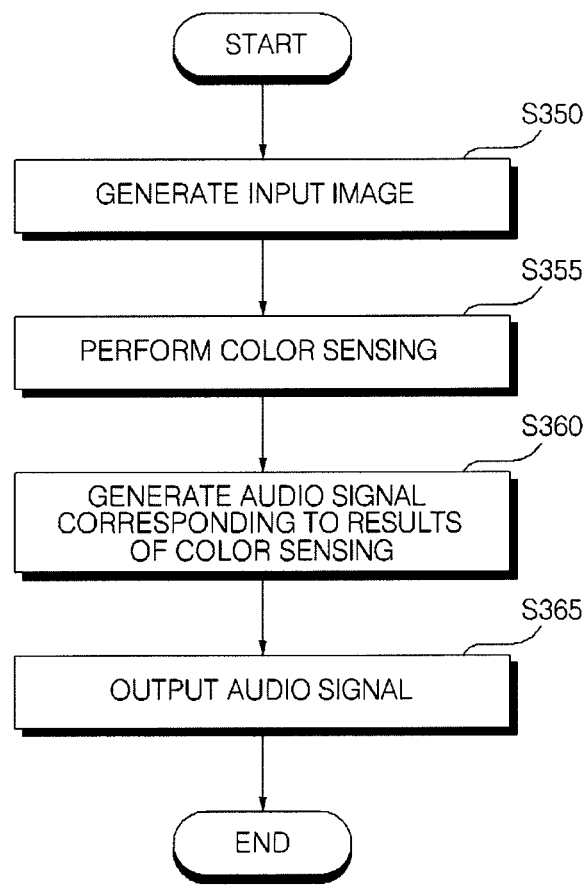
FIG. 13 illustrates a flowchart of a method of controlling the operation of a mobile terminal according to a fourth example embodiment of the present invention.

FIG. 13 illustrates a flowchart of a method of controlling the operation of a mobile terminal according to a fourth example embodiment of the present invention. Referring to FIG. 13, an input image may be generated by capturing an image of a subject using the camera module 121 (S350). The input image may be a still or video image or a streaming preview image of the subject.

The input image may be generated using one of the first and second cameras 121*a* and 121*b*. For example, the input image may be generated by the second camera 121*b* if the user of the mobile terminal 100 wishes to monitor the subject and the display module 151 with a single glance or a viewing. Thereafter, the controller 180 may perform color sensing with the use of the input image (S355).

More specifically, the controller 180 may perform color sensing on the input image by reading the red (R)-green (G)-blue (B) value of each pixel of the input image. That is, once the input image is generated by the camera module 121, the RGB value of each pixel of the input image may be read, and the color of the subject may be determined based on the results of the reading. If the input image is displayed on the display module 151, the colors in the input image may be identified or sensed using a predetermined program.

Alternatively, the controller 180 may perform color sensing on the input image by sensing the color of light irradiated on the display module 151 for displaying the input image with the use of the color sensor 147. For this, the color sensor 147 may use various color detection circuitry. For example, the color sensor 147 may analyze the light irradiated for displaying the input image by using R, G and B color filters or by using a photodiode and the spectral sensitivity thereof.

Still alternatively, the controller 180 may perform color sensing on the input image by displaying the input image on the display module 151 and then measuring a color temperature from the display module 151. In this instance, an additional color sensor for measuring a color temperature may be provided in the display module 151.

The controller 180 may perform color sensing on the subject, instead of on the input image. In this instance, the input image may be displayed on the display module 151 simply for reference.

Color sensing may be performed on a certain area (hereinafter referred to as the target area) in the input image. In this instance, the target area in the input image may be divided into a plurality of sections, and color sensing may be performed on each of the plurality of sections. The target area in the input image may be enlarged or reduced in accordance with a user command. For example, the target area in the input image may be enlarged or reduced by pressing a predetermined button or touching the display module 151 with a hand (or finger) or pen (or stylus), or any other object.

The input image may be divided into a plurality of sections, and color sensing may be performed on each of the sections. In this instance, if each of the sections includes more than one color, a color that prevails in a corresponding section may be sensed as the color of the corresponding section. Thereafter, the ratios of the colors respectively sensed from the sections may be analyzed. As the results of performing color sensing on the input image, a number of audio signals corresponding to the number of sections in the input image may be generated.

If the input image or the target area in the input image includes a plurality of colors, color sensing may be performed on the input image or the target area in the input image in units of the colors. In this instance, a number of audio signals corresponding to the number of colors included in the input image or the target area in the input image may be generated as the results of performing color sensing on the input image.

In the meantime, it may be difficult to provide audio data representing all colors or convert the names of all colors into audio data. Therefore, the controller 180 may classify a color sensed by the color sensor 147 into one of a number of representative colors, and may provide audio data representing each of the representative colors. For example, the controller 180 may classify a color sensed from the subject into one of the following ten representative colors: red, orange, yellow, green, blue, navy, purple, black, white and gray. Thereafter, the controller 180 may determine one of the representative colors most similar to the color sensed from the subject as the color of the subject, and may output audio data representing the name of the corresponding representative color. The number of representative colors for classifying a color sensed by the color sensor 147 can be changed arbitrarily, and thus does not restrict the scope of the present invention.

Thereafter, the controller 180 may detect a color from the subject through the above-mentioned color sensing operation, and may generate an audio signal corresponding to the detected color (S360). More specifically, the controller 180 may determine the name of the detected color, and may generate an audio signal representing the determined color name.

Thereafter, the controller 180 may output the audio signal generated in operation S360 via the audio output module 152 or the alarm module 153 (S365). If more than one color is sensed from the input image or the subject, a number of audio signals corresponding to the number of colors sensed from the input image or the subject may be generated and output.

For example, the audio signal generated in operation S360 may be output via the audio output module 152, and an alarm signal indicating that heterogeneous colors are sensed from the input image may be output via the alarm module 153. If the output of audio data from the mobile terminal 100 is restricted, for example, if the mobile terminal 100 is placed in "Manner Mode," (or a quite mode) a vibration signal, instead of an audio signal, may be output via the haptic module 154, or display a visual message, such as a text, symbol or flashing.

Figure 14:
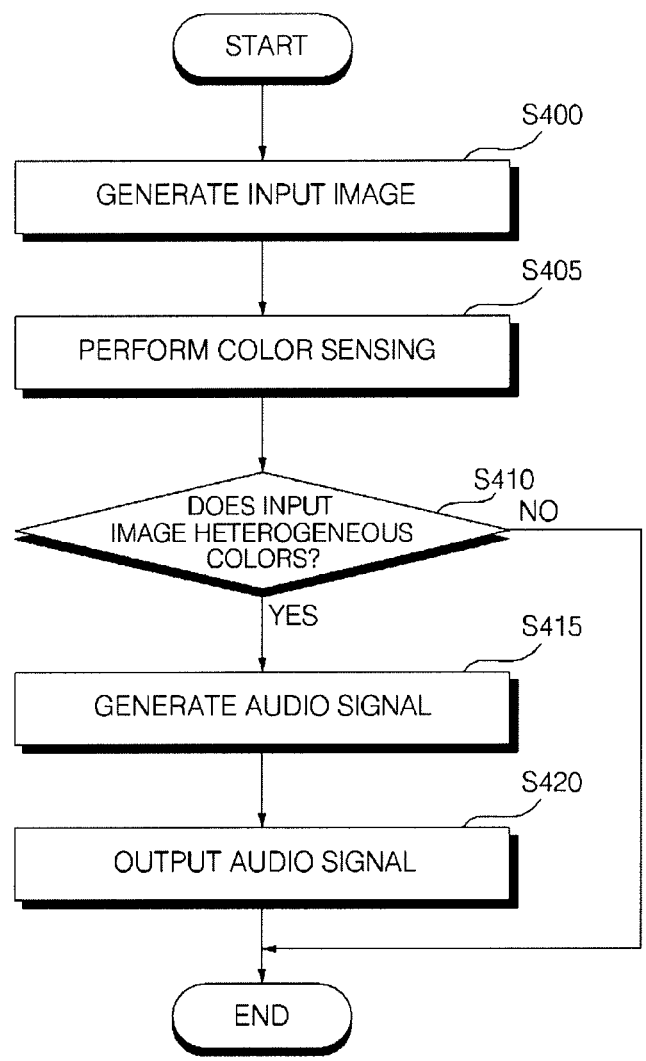
FIG. 14 illustrates a flowchart of a method of controlling the operation of a mobile terminal according to a fifth example embodiment of the present invention.

FIG. 14 illustrates a flowchart of a method of controlling the operation of a mobile terminal according to a fifth example embodiment of the present invention. Referring to FIG. 14, an input image may be generated by capturing an image of a subject using the camera module 121 (S400). The camera module 121 may recognize the subject with the use of an image sensor, and may generate the input image by capturing an image of the subject. The input image may be a still or video image or a streaming preview image of the subject.

Thereafter, the controller 180 may perform color sensing with the use of the input image (S405). More specifically, the controller 180 may measure a color temperature from the display module 151 where the input image is displayed, may detect color values from the input image or may read the color value of each pixel of an image signal corresponding to the input image.

As a result of operation S405, the controller 180 may identify each color in the input image, and may identify a primary color that prevails in the input image, and may determine whether there are other colors in the input image.

Thereafter, the controller 180 may determine whether the input image includes two or more heterogeneous colors (S410) by comparing the colors identified in operation S405.

When there is a difference between the color values or color temperatures of the colors identified in operation S405, the controller 180 may determine that the colors identified in operation S405 are heterogeneous. More specifically, if the difference between the color values or color temperatures of the colors identified in operation S405 is greater than a predefined reference level set in advance, the controller 180 may determine that the colors identified in operation S405 are heterogeneous. This example embodiment may be useful for detecting different colors in the subject, such as a crack or impurities in the subject.

Thereafter, the controller 180 may generate an audio signal indicating the results of the determination performed in operation S410 (S415). More specifically, if the input image includes two or more colors and the difference between the color values or color temperatures of the colors included in the input image is greater than a predefined reference level, it may be determined that the subject has a crack or impurities. Thus, the controller 180 may generate and output an audio signal (or other indication, such as visual or haptic) in order to alert the user of the mobile terminal 100. On the other hand, if it is determined in operation S410 that the colors identified in operation S405 are homogeneous, the method ends without outputting an audio signal, or other indication.

The audio signal generated in operation S415 may be output via the output unit 150 (particularly, the audio output module 152) (S420). The audio signal generated in operation S415 may be an alarm sound. More specifically, in order to alert the user of the mobile terminal 100 to whether the input image includes heterogeneous colors, the controller 180 may control the alarm module 153 to output an alarm sound if the input image includes heterogeneous colors. If the input image does not include heterogeneous colors, the controller 180 may control the alarm module 153 to output an alarm sound. Also, visual and/or haptic indications may be output via relevant modules of the mobile terminal 100.

Figure 15:
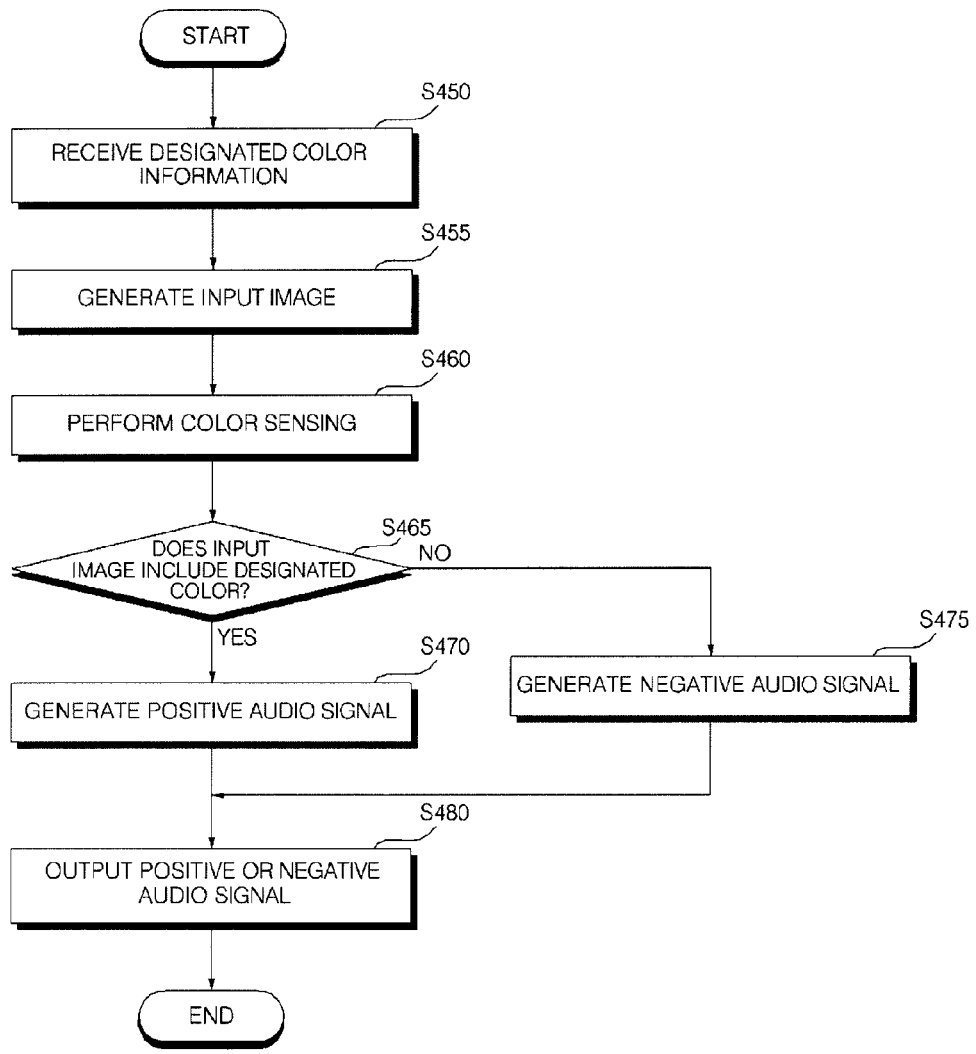
FIG. 15 illustrates a flowchart of a method of controlling the operation of a mobile terminal according to a sixth example embodiment of the present invention.

FIG. 15 illustrates a flowchart of a method of controlling the operation of a mobile terminal according to a sixth example embodiment of the present invention. In the sixth example embodiment, the mobile terminal 100 may output an audio signal indicating whether a certain color such as a color desired by the user of the mobile terminal 100 has been detected from a subject. For convenience, a color desired to be detected will hereinafter be referred to as a designated color, and color information regarding the designated color will hereinafter be referred to as designated color information.

A designated color may be set by entering designated color information into the mobile terminal 100. More specifically, the user of the mobile terminal 100 may select one of a plurality of default colors provided by the mobile terminal 100 as a designated color. Alternatively, the user of the mobile terminal 100 may detect a color from a predetermined subject with the use of the color sensor 147. Then, the user of the mobile terminal 100 may temporarily store the detected color in the mobile terminal 100 and, at the same time, register the temporarily stored color as a designated color.

Referring to FIG. 15, the controller 180 may receive designated color information (S450). Thereafter, the controller 180 may generate an input image by capturing an image of a subject, which is the target of color sensing, using the camera module 121 (S455). The input image may be a still or video image or a streaming preview image of the subject.

Thereafter, the controller 180 may perform color sensing with the use of the input image (S460). As described above, the controller 180 may use various methods, color detection programs and color sensors to perform color sensing.

Thereafter, the controller 180 may determine whether the input image or a target area in the input image includes the same color as a designated color specified by the received designated color information by comparing the results of color sensing performed in operation S460 with the received designated color information (S465). Thereafter, the controller 180 may determine whether to output an audio signal and the type of audio signal to be output in accordance with whether the input image or the target area in the input image includes the same color as the designated color. In order to precisely determine whether the input image or the target area in the input image includes the same color as the designated color, the controller 180 may set a range of errors. Then, if the difference between the color temperature or color value of a color detected from the input image or the target area in the input image and the color temperature or color value of the designated color is within the set range of errors, the controller 180 may determine the color detected from the input image or the target area in the input image and the designated color as identical.

If it is determined in operation S460 that the input image or the target area in the input image includes the same color as the designated color, the controller 180 may generate a positive audio signal in order to alert the user of the mobile terminal 100 (S470). On the other hand, if it is determined in operation S460 that the input image or the target area in the input image does not include the same color as the designated color, the controller 180 may generate a negative audio signal in order to alert the user of the mobile terminal 100 (S475).

The sixth example embodiment can be applied not only to searching the input image for the same color as the designated color but also to searching the input image for a color having a certain relationship with the designated color such as the complementary color of the designated color or a color having the same hue as the designated color, but a different brightness or saturation from the designated color.

Thereafter, the controller 180 may control the output unit 150 to output the positive or negative audio signal (S480). The positive or negative audio signal may be an alarm sound or may be a voice message indicating the name of a color detected from the input image or the target area in the input image.

More specifically, the first or second audio signal may be output by the output unit 150. For example, the audio output module 152 may output a voice message indicating color information regarding a color detected from the input image or the target area in the input image (such as the name of the detected color). The alarm module 153 may output an alarm sound indicating whether the input image or the target area in the input image includes the same color as the designated color. If the output of audio data from the mobile terminal 100 is restricted, e.g., if the mobile terminal 100 is placed in "Manner Mode," a text message indicating color information regarding the detected color and whether the detected color and the designated color are identical may be displayed on the display module 151. Other indications, such as visual and/or haptic indications may be provided.

Figure 16:
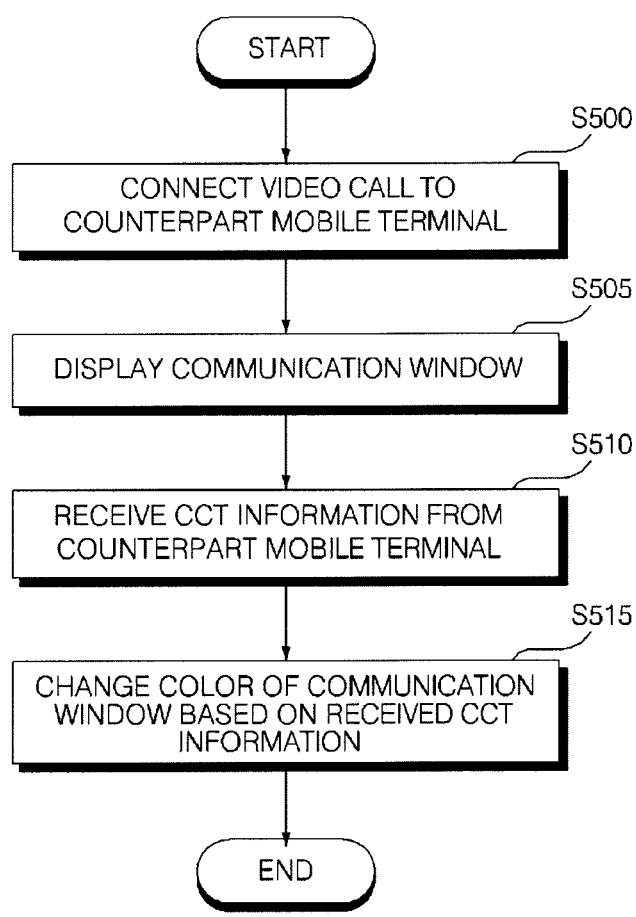
FIG. 16 illustrates a flowchart of a method of controlling the operation of a mobile terminal according to a seventh example embodiment of the present invention.

FIG. 16 illustrates a flowchart of a method of controlling the operation of a mobile terminal according to a seventh example embodiment of the present invention. Referring to FIG. 16, the wireless communication unit 110 may set a connection between the mobile terminal 100 and a counterpart mobile terminal for transmitting data to or receiving data from the counterpart mobile terminal (S500). Thereafter, a communication window showing data currently being transmitted between the mobile terminal 100 and the counterpart mobile terminal may be displayed on the display module 151 (S505). The same communication window as that displayed on the display module 151 may be displayed on the display module of the counterpart mobile terminal.

More specifically, in the case of connecting a video call between the mobile terminal 100 and the counterpart mobile terminal, the mobile communication module 113 of the wireless communication unit 110 may exchange data with at least one of a base station and the counterpart mobile terminal via a mobile communication network, and a communication window showing the exchanged data may be displayed on the display module 151 in operation S505. In the case of transmitting a text message between the mobile terminal 100 and the counterpart mobile terminal via a wireless interne connection using a messenger service, a communication window showing the text message may be displayed on the display module 151 in operation S505.

In short, the communication window displayed in operation S505 may be a video call window or a messenger conversation window.

Thereafter, the controller 180 may receive ambient lighting information from the counterpart mobile terminal via the wireless communication unit 110 (S510). The ambient lighting information, which is information regarding the lighting conditions of the surroundings of the counterpart mobile terminal, may include CCT information and lighting brightness information. The counterpart mobile terminal, like the mobile terminal 100, may be equipped with a color sensor. In this instance, the counterpart mobile terminal may measure ambient color temperature and may thus generate CCT information based on the results of the measurement. Thereafter, the counterpart mobile terminal may transmit the generated CCT information to the mobile terminal 100, and thus, the mobile terminal 100 may determine what the surroundings of the counterpart mobile terminal are like based on the CCT information provided by the counterpart mobile terminal. Since the mobile terminal 100 is equipped with the color sensor 147, the mobile terminal 100 can also measure ambient color temperature, generate CCT information based on the results of the measurement, and may transmit the generated CCT information to the counterpart mobile terminal. However, in this example embodiment, it is assumed that the mobile terminal 100 receives CCT information from the counterpart mobile terminal.

If CCT information is received from the counterpart mobile terminal, the controller 180 may change the color of the communication window displayed in operation S505 based on the received CCT information (S515). For example, if the received CCT information indicates that the counterpart mobile terminal is under red light, the mobile terminal 100 may turn the color of the communication window displayed in operation S505 into red. On the other hand, if the received CCT information indicates that the counterpart mobile terminal is under blue lighting, the mobile terminal 100 may turn the color of the communication window displayed in operation S505 into blue. Therefore, the user of the mobile terminal 100 may determine what the surroundings of the counterpart mobile terminal are like or even feel as if he or she shares the same atmosphere and space with the user of the counterpart mobile terminal.

Table 1 shows various lighting conditions and their approximate color temperatures.

TABLE 1

| Lighting Conditions | Color Temperature |
| --- | --- |
| Blue sky reflected on water or sunny blue sky | 10,000 K or Higher |
| Overcast cloudy or foggy day | 8,000 K |
| Cloudy day | 7,000 K |
| Stroboscope or Daylight | 6,000 K |
| Clear sky at noon | 5,500 K |
| In morning or evening | 4,000 K |
| Tungsten/halogen lamp | 3,200 K |
| At sunrise or sunset | 2,800 K |
| Incandescent light bulb/Candle flame | 2,000 K |

Thereafter, the controller 180 may select a color based on the CCT information provided by the counterpart mobile terminal, and may change the color of the communication window displayed on the display module 151 into the selected color. The CCT information provided by the counterpart mobile terminal may indicate the location of the counterpart mobile terminal, and particularly, whether the counterpart mobile terminal is located indoors or outdoors and what the weather is like where the counterpart mobile terminal is located. Therefore, the controller 180 may determine what the surroundings of the counterpart mobile terminal are like based on the CCT information provided by the counterpart mobile terminal, and may change the color of the communication window displayed on the display module 151 appropriately in accordance with the results of the determination. For example, if the counterpart mobile terminal is determined to be located indoors, the controller 180 may change the color of the communication window into green. On the other hand, if the counterpart mobile terminal is determined to be located outdoors and the weather where the counterpart mobile terminal is determined to be sunny, the controller 180 may change the color of the communication window into red. On the other hand, if the counterpart mobile terminal is determined to be located outdoors and the weather where the counterpart mobile terminal is located is determined to be cloudy, the controller 180 may change the color of the communication window into orange. Therefore, the user of the mobile terminal 100 may easily determine whether the counterpart mobile terminal is located indoors or outdoors and what the weather where the counterpart mobile terminal is located is like based on the color of the communication widow displayed on the display module 151. In embodiments of the present invention, indication of the meanings of the color may be provided or displayed to enable the user to discern the meaning of the provided color, so that the user, who may be unfamiliar with the color of the communication window, is able to determine the location of the counterpart mobile terminal.

Figure 17:
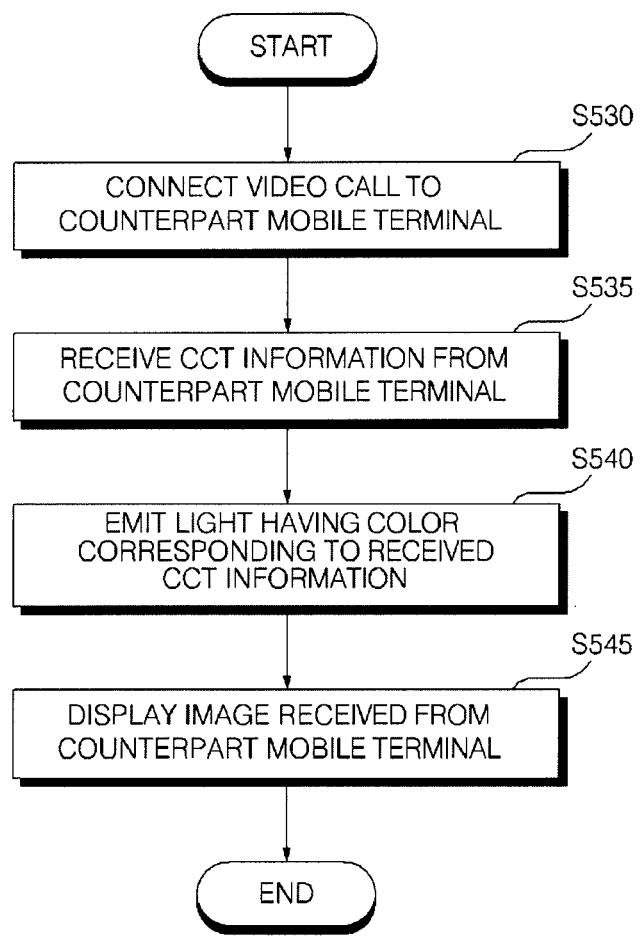
FIG. 17 illustrates a flowchart of a method of controlling the operation of a mobile terminal according to an eighth example embodiment of the present invention.

FIG. 17 illustrates a flowchart of a method of controlling the operation of a mobile terminal according to a seventh example embodiment of the present invention. Referring to FIG. 17, the wireless communication unit 110 may set a connection between the mobile terminal 100 and a counterpart mobile terminal for making or receiving a video call to or from the counterpart mobile terminal (S530). Thereafter, the mobile terminal 100 may receive ambient lighting information from the counterpart mobile terminal via the wireless communication unit 110 (S535). The ambient lighting information, which is information regarding the lighting conditions of the surroundings of the counterpart mobile terminal, may include CCT information and lighting brightness information. In this example embodiment, it is assumed that the ambient lighting information includes CCT information.

The counterpart mobile terminal may measure an ambient color temperature with the use of a color sensor, may generate CCT information based on the result of the measurement, and may transmit the CCT information to the mobile terminal 100. Then, the controller 180 may interpret the CCT information provided by the counterpart mobile terminal, and may select a color based on the results of the interpretation. Thereafter, light having the selected color may be emitted from the lighting module 156 through part of the display module 151 or the entire display module 151 or through a keypad (S540). Thereafter, a video call image received from the counterpart mobile terminal may be displayed on the display module 151 (S545). The emission of the light having the selected color by the lighting module 156 may continue until a video call between the user of the mobile terminal 100 and the user of the counterpart mobile terminal is terminated. Therefore, the user of the mobile terminal 100 may determine what the surroundings of the counterpart mobile terminal are like during a video call with the user of the counterpart mobile terminal.

Figure 18:
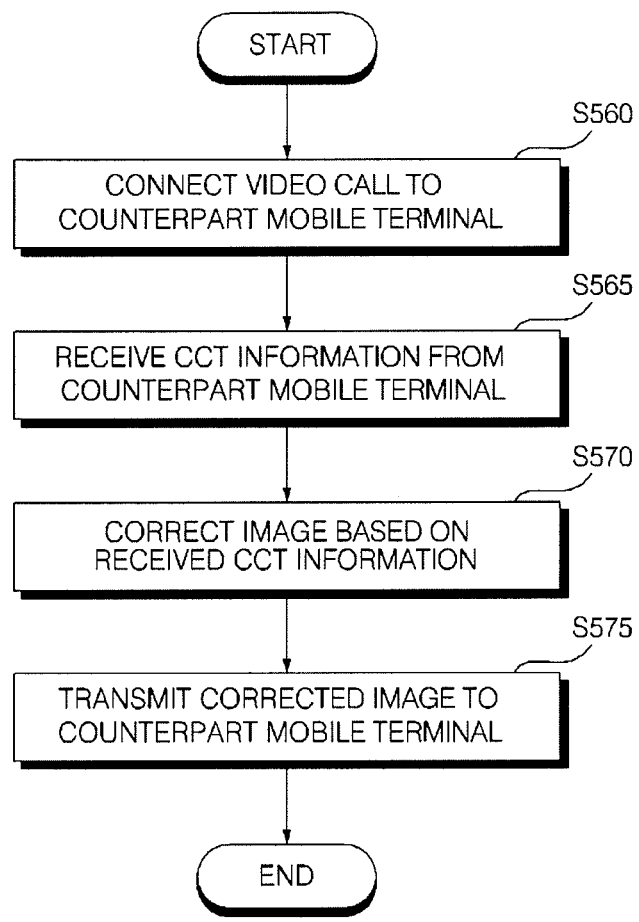
FIG. 18 illustrates a flowchart of a method of controlling the operation of a mobile terminal according to a ninth example embodiment of the present invention.

FIG. 18 illustrates a flowchart of a method of controlling the operation of a mobile terminal according to a ninth example embodiment of the present invention. In this example embodiment, the mobile terminal 100 may correct a video call image based on CCT information provided by a counterpart mobile terminal, and may transmit the corrected video call image to the counterpart mobile terminal.

Referring to FIG. 18, a connection may be set between the mobile terminal 100 and a counterpart mobile terminal for making or receiving a video call, and a video call between the mobile terminal 100 and the counterpart mobile terminal may be initiated (S560). Thereafter, the mobile terminal 100 may receive ambient lighting information from the counterpart mobile terminal via the wireless communication unit 110 (S570). The ambient lighting information, which is information regarding the lighting conditions of the surroundings of the counterpart mobile terminal, may include CCT information and lighting brightness information. In this example embodiment, it is assumed that the ambient lighting information includes CCT information. That is, the counterpart mobile terminal may measure its ambient color temperature with the use of a color sensor, may generate CCT information based on the result of the measurement and may transmit the generated CCT information to the mobile terminal 100.

The camera module 121 may generate a video call image to be sent to the counterpart mobile terminal by capturing an image of the user of the mobile terminal 100 and the background of the user of the mobile terminal 100. Thereafter, the controller 180 may correct the video call image based on the ambient lighting information provided by the counterpart mobile terminal (S575). Examples of the correction of the video call image include adjusting the brightness, contrast, white balance and saturation of the generated video call image.

If the ambient lighting information provided by the counterpart mobile terminal also includes lighting brightness information, the controller 180 may be able to precisely adjust the brightness or contrast of the video call image based on the lighting brightness information.

The ambient lighting information provided by the counterpart mobile terminal may include more than one piece of CCT information, such as ambient CCT information and CCT information, which is obtained by measuring the ambient color temperature of the counterpart mobile terminal, and display CCT information, which is obtained by measuring color temperature from the display module of the counterpart mobile terminal. In this instance, the controller 180 may use both the ambient CCT information and the display CCT information to correct the video call image. That is, the controller 180 may correct, for example, the white balance of the video call image, in consideration of both the ambient lighting conditions of the counterpart mobile terminal and the display properties of the counterpart mobile terminal so that the video call image can be easily recognized by the user of the counterpart mobile terminal and can become sharper and more vivid.

For example, if the ambient CCT information indicates that the counterpart mobile terminal is under red light and the display CCT information indicates that the color displayed by the display module of the counterpart mobile terminal is red, the controller 180 may correct the video call image such that the amount of red in the video call image can be reduced. That is, if the ambient lighting or the display module of the counterpart mobile terminal is blue, the controller 180 may adjust the white balance of the video call image by increasing the amount of red in the video call image. On the other hand, if the ambient lighting or the display module of the counterpart mobile terminal is red, the controller 180 may adjust the white balance of the video call image by increasing the amount of blue in the video call image.

Once the video call image is corrected in the above-mentioned manner, the controller 180 may transmit the corrected video call image to the counterpart mobile terminal via the wireless communication unit 110 (S575).

Figure 19:
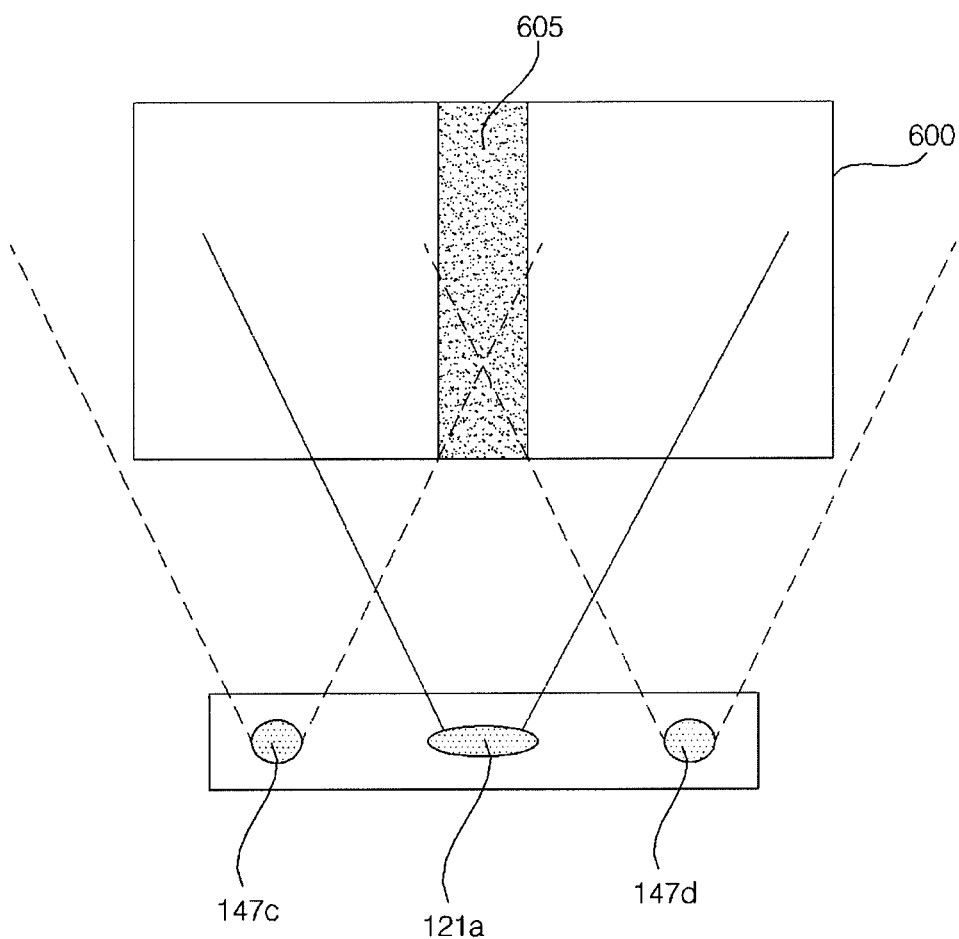
FIG. 19 illustrates a diagram showing an example of the arrangement of a camera and a plurality of color sensors.

FIG. 19 illustrates a diagram showing an example of the arrangement of the first camera 121a and a plurality of color sensors 147c and 147d. If a color sensor and a camera of a mobile terminal are located too much apart, the color sensor may not be able to properly sense colors from a subject in the focal range of the camera. In order to address this problem, the color sensors 147c and 147d may be disposed on either side of the first camera 121a, and the controller 180 may be configured to sense colors only from the overlapping area 605 of the sensing areas 600 of the color sensors 147c and 147d.

Therefore, the mobile terminal 100 can effectively acquire color data from an area corresponding to the focal range of the first camera 121a when taking a long shot. On the other hand, when taking a close-up shot, the mobile terminal 100 may acquire color data by selecting one of the color sensors 147c and 147d. In the case of correcting an image captured by the first camera 121a, different color identification algorithms may be used for different shooting modes of the first camera 121a (such as a long-shot mode and a close-up-shot mode).

Figure 20:
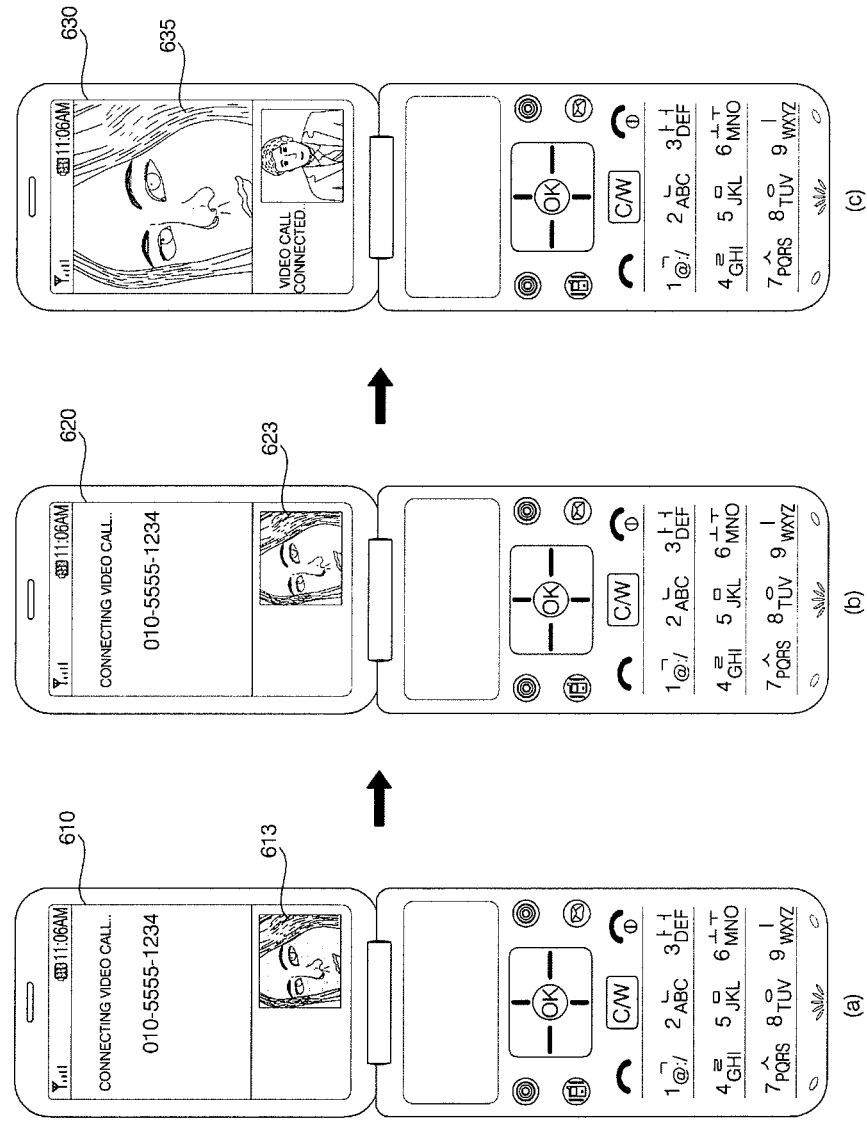
FIG. 20 illustrates diagrams for explaining how to correct or adjust a video call image.

FIG. 20 illustrates diagrams for explaining how to correct a video call image during a video call. Referring to (a) of FIG. 20, during the connection of a video call between the mobile terminal 100 and a counterpart mobile terminal, a screen 610 may be displayed. Then, if the skin tone of the user of the mobile terminal 100 in a video call image 316 is determined to be darker or different than a reference skin tone, a screen 620 including a skin tone-corrected video call image 623 obtained by correcting the skirt tone of the user of the mobile terminal 100 in the video call image 316 may be displayed, as shown in (b) of FIG. 20. The skin tone-corrected video call image 623 may be transmitted to the counterpart mobile terminal during the connection of a video call between the mobile terminal 100 and the counterpart mobile terminal. Thereafter, when a video call between the mobile terminal 100 and the counterpart mobile terminal is initiated, the skin tone-corrected video call image 623 may be displayed on the screen of the counterpart mobile terminal as a video call image 635. Therefore, the user of the counterpart mobile terminal can easily view and identify the face of the user of the mobile terminal 100 from the video call image 635.

Figure 21:
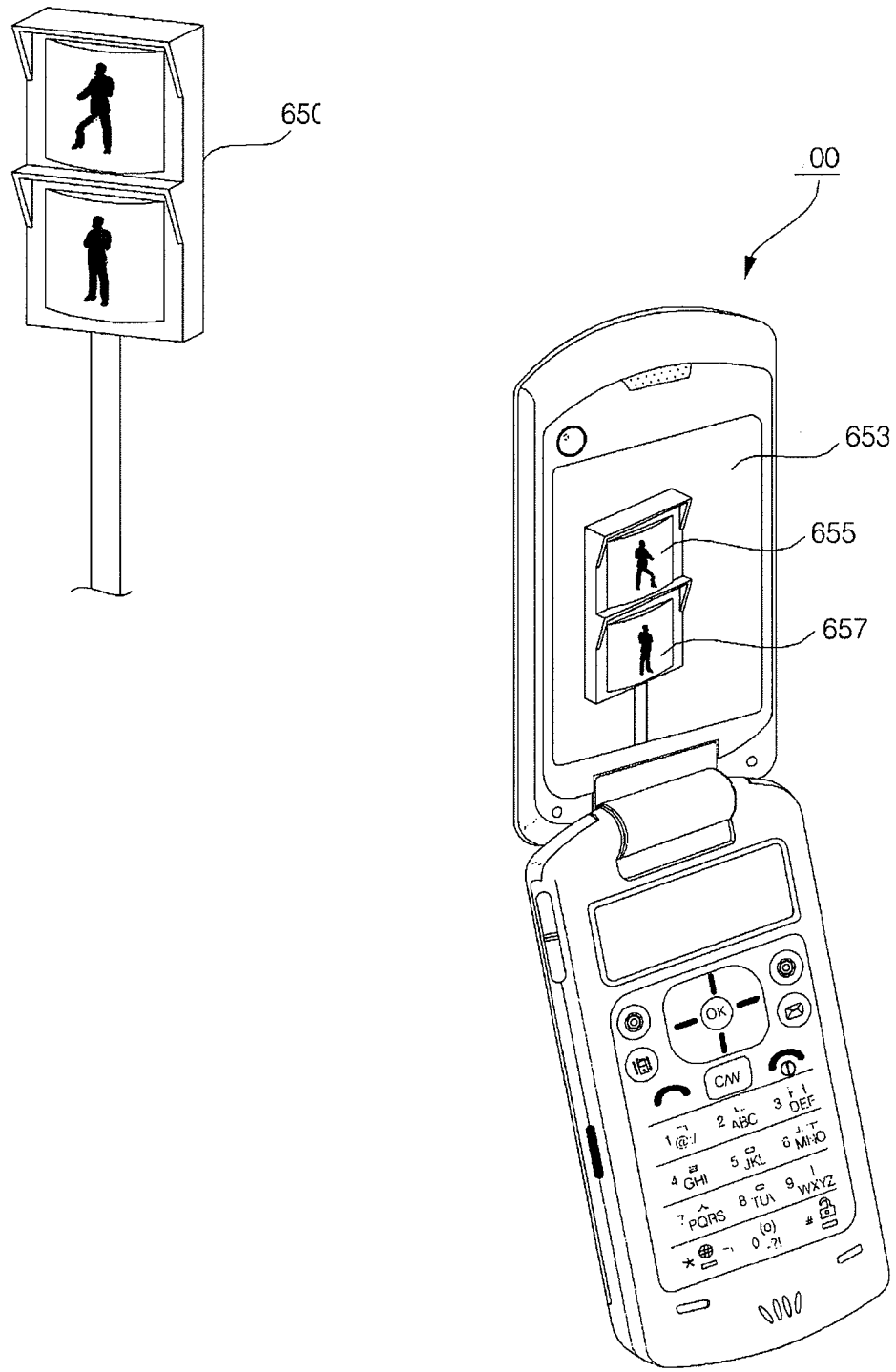
FIGS. 21 and 22 illustrate diagrams for explaining how to sense the color of a subject.
Figure 22:
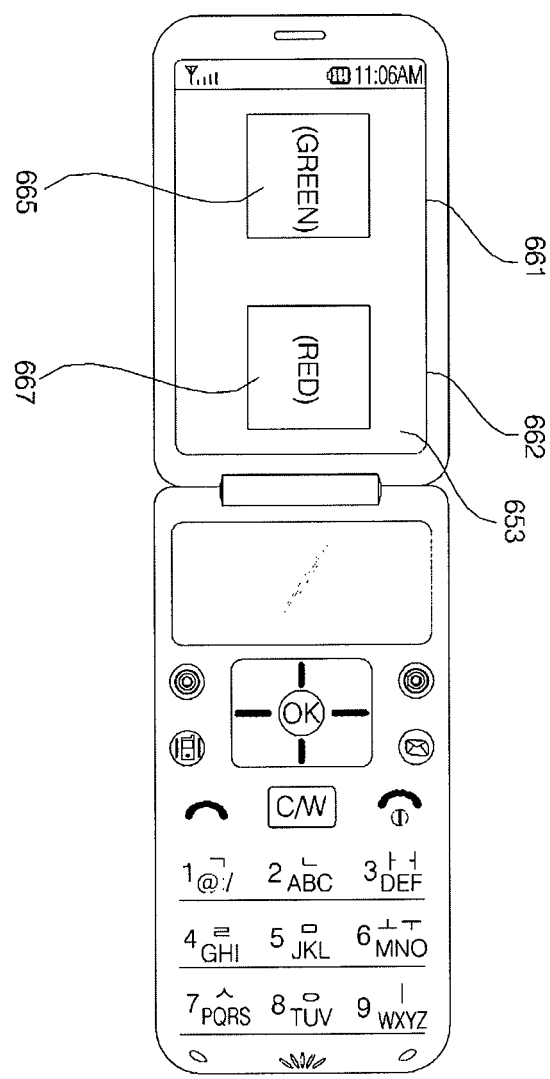

FIGS. 21 and 22 illustrate diagrams for explaining how to recognize the color of a subject. Referring to FIG. 21, the user of the mobile terminal 100 may generate an input: image 653 of a traffic light 650 by using a camera provided at the rear of the mobile terminal 100 while holding the mobile terminal 100 toward the traffic light 650. The input image 653 may be a preview image or a captured image of the traffic light 650.

When a green light 655 is turned on, the input image 653 may include green and black. On the other hand, when a red light 657 is turned on, the input image 653 may include red and black. The whole input image 653 or part of the input image 653 may be subjected to color sensing. Part of the input image 653 subjected to color sensing may be referred to as a target area. That is, the whole input image 653 or part of the input image 653 may become the target area. The target area may be divided into a number of sections according to the number of colors included in the target area and the proportion of the area displayed in each of the colors included in the target area. In this instance, a number of color sensing results corresponding to the number of sections of the target area may be obtained.

In this manner, it is possible to obtain color data of a subject through color sensing and thus help the user of the mobile terminal 100 precisely determine the color of the traffic light 650.

Referring to FIG. 22, the input image 653 or the target area in the input image 653 may be divided into a plurality of sections. Since the input image 653 includes two colors, i.e., green and red, the input image 653 may be divided into two sections: first and second sections 661 and 662 corresponding to the green and red lights 665 and 667, respectively. Therefore, two color sensing results respectively corresponding to the first and second sections 661 and 662 can be obtained. Each of the two color sensing results may be converted into an audio signal, and the audio signal may be output.

More specifically, once one or more colors in the target area of the input image 653 are recognized through color sensing, an audio signal indicating the names of the recognized colors (such as "red and black" or "green and black") may be output via, for example, a speaker of the mobile terminal 100. The color sensor 147 may be configured to be able to recognize both red and light. In this instance, if two colors are recognized from the input image 653, the color sensor 147 may determine one of the recognized colors having a higher brightness and/or saturation than the other as the color of the light currently being turned on. Then, an audio signal indicating the name of the color determined to be the color of the light currently being turned on. An audio signal indicating the name of a color sensed by the color sensor 147 may be provided in one or more language.

Figure 23:
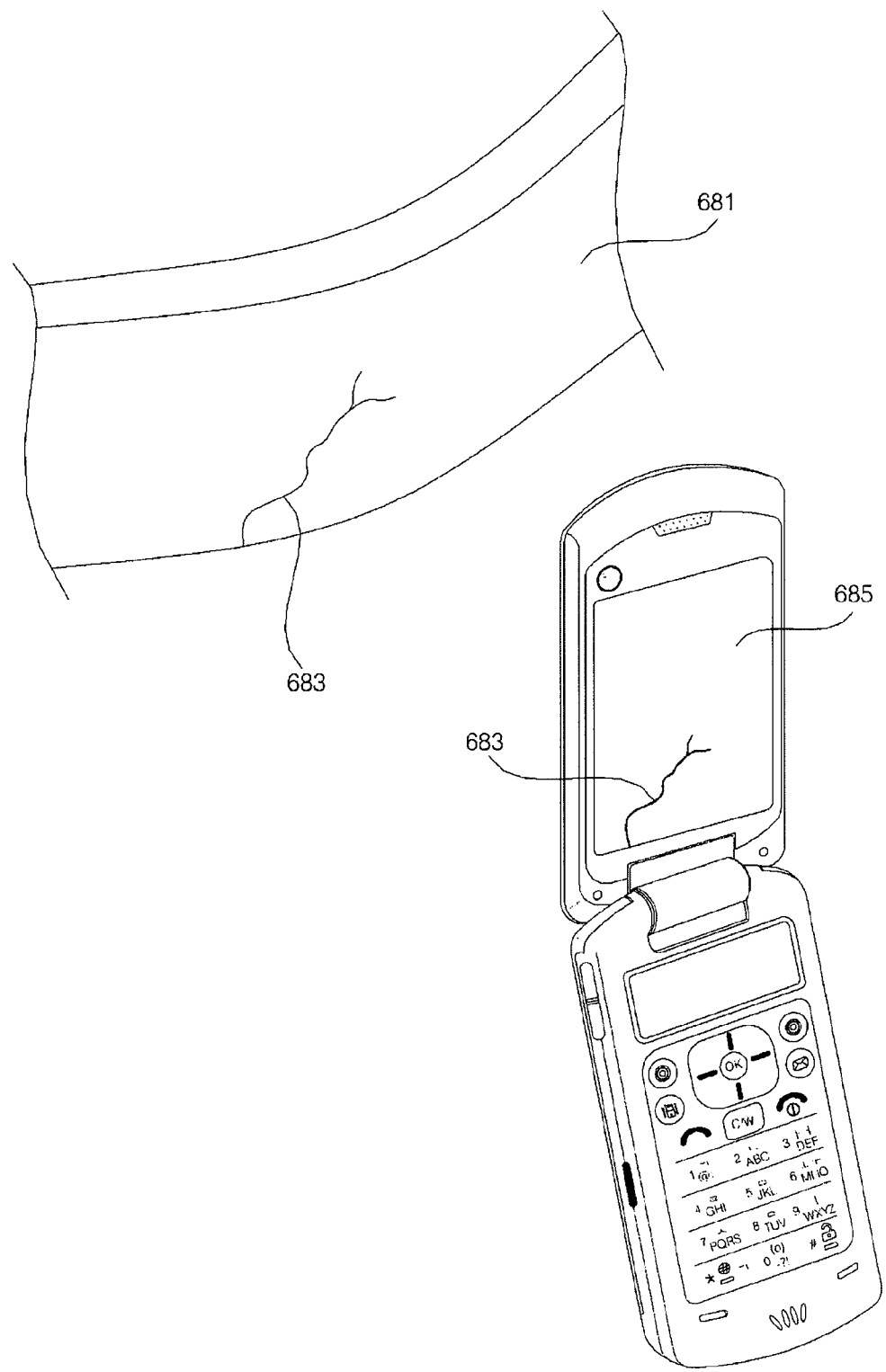
FIGS. 23 through 25 illustrate diagrams for explaining how to sense a crack or impurities in an object through color sensing.
Figure 24:
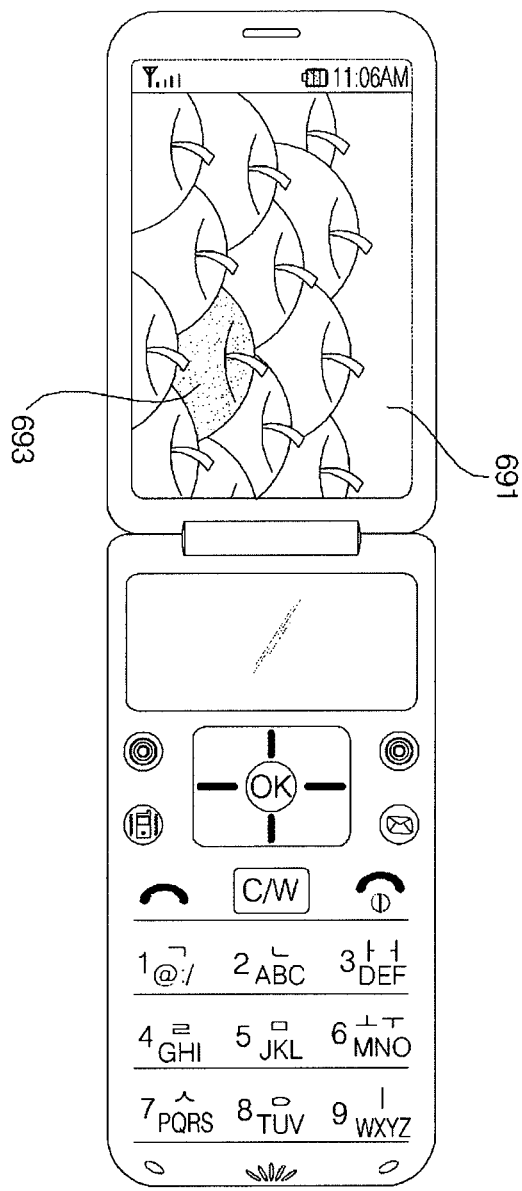
Figure 25:
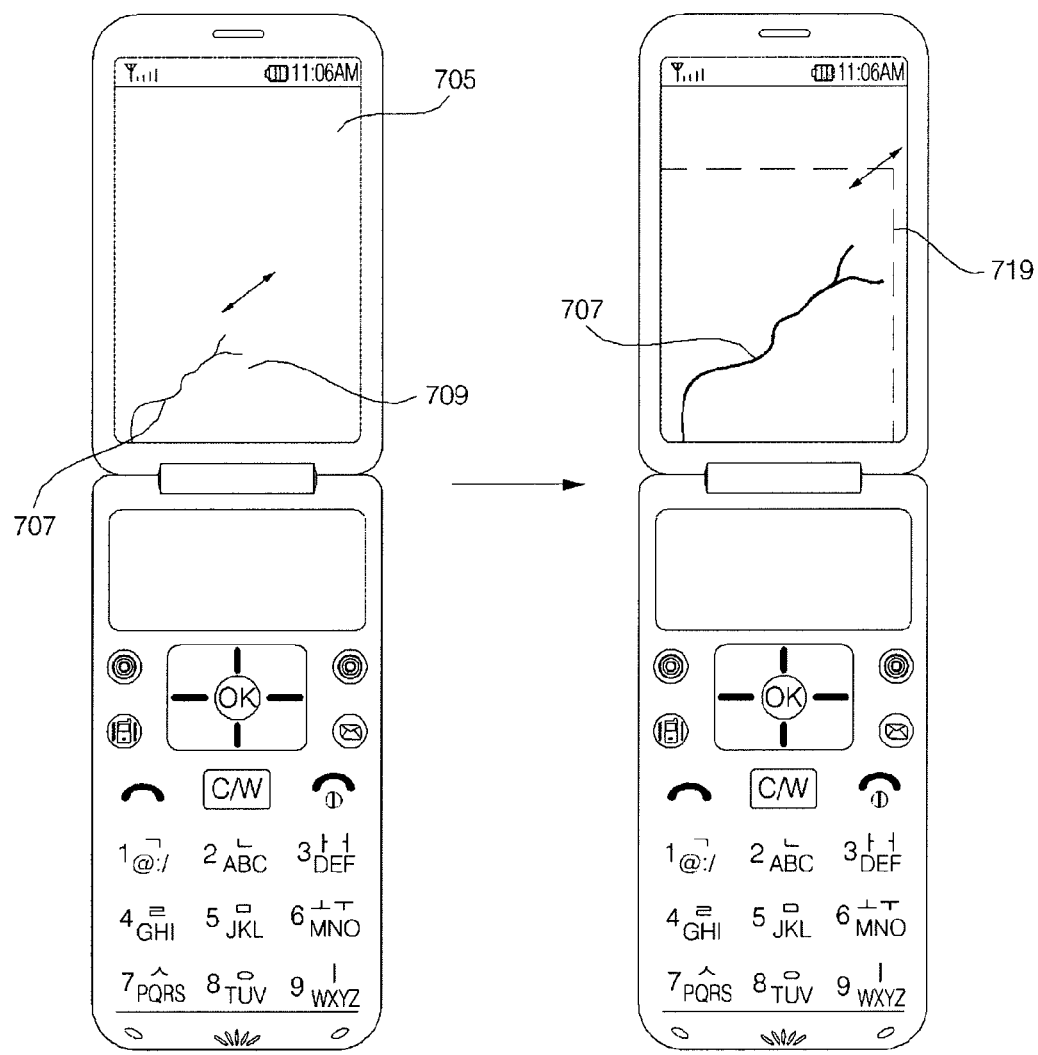

FIGS. 23 through 25 illustrate diagrams for explaining how to detect a crack or impurities in a subject from an input image. Referring to FIG. 23, an input image 685 of a subject 681 (such as a building or a wall) with a homogeneous color may be displayed on the display module 151. The subject 681 has a crack 683 that looks different in color from the rest of the subject 681. In this instance, an alert sound indicating that there is a portion of the input image 685 having a distinctively different color from the rest of the input image 685 may be output, instead of audio data indicating the names of colors detected from the input image 685. In this manner, the user of the mobile terminal can easily determine whether the subject 681 has a crack or impurities based on the result of color sensing performed on the input image 685.

The color sensor 147 can easily detect the crack 683 of the subject 681 from the input image 685 because the crack 683 has a distinctively different color from the rest of the subject 681. Therefore, once the crack 683 of the subject 681 is detected from the input image 685, the mobile terminal 100 may output an audio signal indicating the existence of the crack 683 in the subject 681 via the output unit 150.

Referring to FIG. 24, an input image 691 displayed on the display module 151 may be an image of a plurality of fruits. If the color sensor 147 detects that one of the fruits in the input image 691 has a distinctively different color from the other fruits, as indicated by reference numeral 693, the mobile terminal 100 may output an audio signal as an alert.

Referring to FIG. 25, if a very small crack 707 is detected from a predetermined part 709 of an input image 705, the input image 705 may be enlarged, as indicated by reference numeral 719, in order to get a better view of the crack 707. The input image 705 may be reduced if necessary. If the input image 705 is enlarged or reduced, the crack 707 may also be enlarged or reduced accordingly.

If the input image 705 is enlarged, a target area of color sensing may decrease, but a precise color sensing is possible. On the other hand, if the input image 705 is reduced, the target area may increase, and thus, color sensing can be performed on a wider area.

Figure 26:
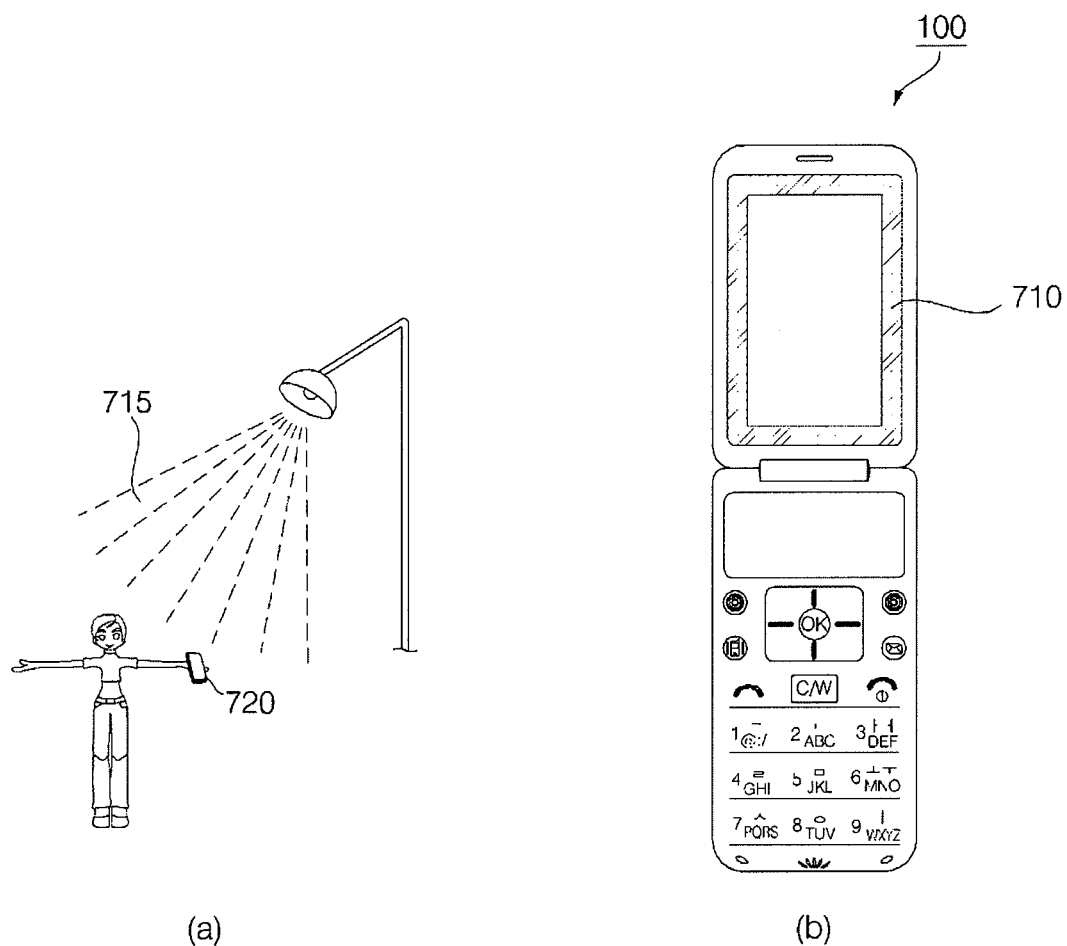
FIGS. 26 and 27 illustrate diagrams for explaining how to change the color of a communication window based on color temperature information provided by a counterpart mobile terminal.
Figure 27:
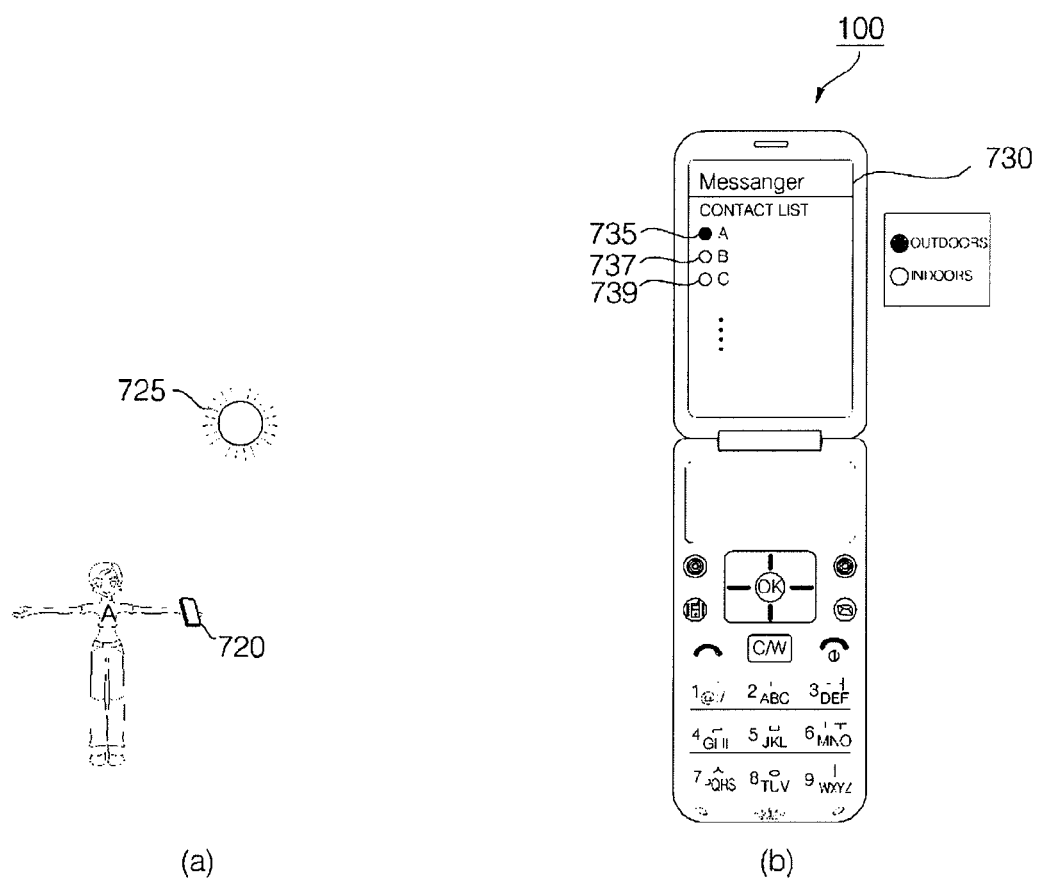

FIGS. 26 and 27 illustrate diagrams for explaining how to change the color of a communication window in accordance with color temperature information provided by a counterpart mobile terminal. Referring to (a) and (b) of FIG. 26, when the mobile terminal 100 wirelessly communicates with a mobile terminal 720, which is under incandescent lighting 715, a communication window 710 may be displayed on the display module 151.

The mobile terminal 720 may measure the color temperature of the incandescent lighting 715 with the use of a color sensor, may generate CCT information based on the results of the measurement, and may transmit the generated CCT information to the mobile terminal 100. Since the color temperature of typical incandescent lighting is about 2,000 K according to Table 1, the CCT information generated by the mobile terminal 720 may specify a color temperature of 2,000 K. Thus, the mobile terminal 100 may change the color of the communication window 710 into a color corresponding to a color temperature of 2,000 K, such as red or orange in accordance with the CCT information provided by the mobile terminal 720. Therefore, the user of the mobile terminal 100 may feel as if he or she shares the same atmosphere and space with the user of the mobile terminal 720.

Referring to (a) and (b) of FIG. 27, when the user of the mobile terminal 100 participates in a chat session with users A, B and C, a communication window 730 showing a list of the participants in the chat session, i.e., users A, B and C, and icons 735, 737 and 738 respectively representing users A, B and C may be displayed on the display module 151. User A is the user of the mobile terminal 720 which is outdoors on a clear day.

The mobile terminal 720 may measure its ambient color temperature with the use of a color sensor, generate CCT information based on the results of the measurement and transmit the generated CCT information to the mobile terminal 100. Since the color temperature on a clear day is about 5,500 K according to Table 1, the CCT information generated by the mobile terminal 720 may specify a color temperature of 5,500 K. Thus, the mobile terminal 100 may determine, based on the CCT information provided by the mobile terminal 720, that user A is currently outdoors, and that the weather where user A is located is clear.

Since user A is determined to be outdoors whereas users B and C are determined to be indoors, the icon 725 corresponding to user A may be displayed in black, and the icons 737 and 739 respectively corresponding to users B and C may be displayed in white. Therefore, the user of the mobile terminal 100 can easily identify whether users A, B and C are indoors or outdoors based on the colors of the icons 735, 737 and 739.

Figure 28:
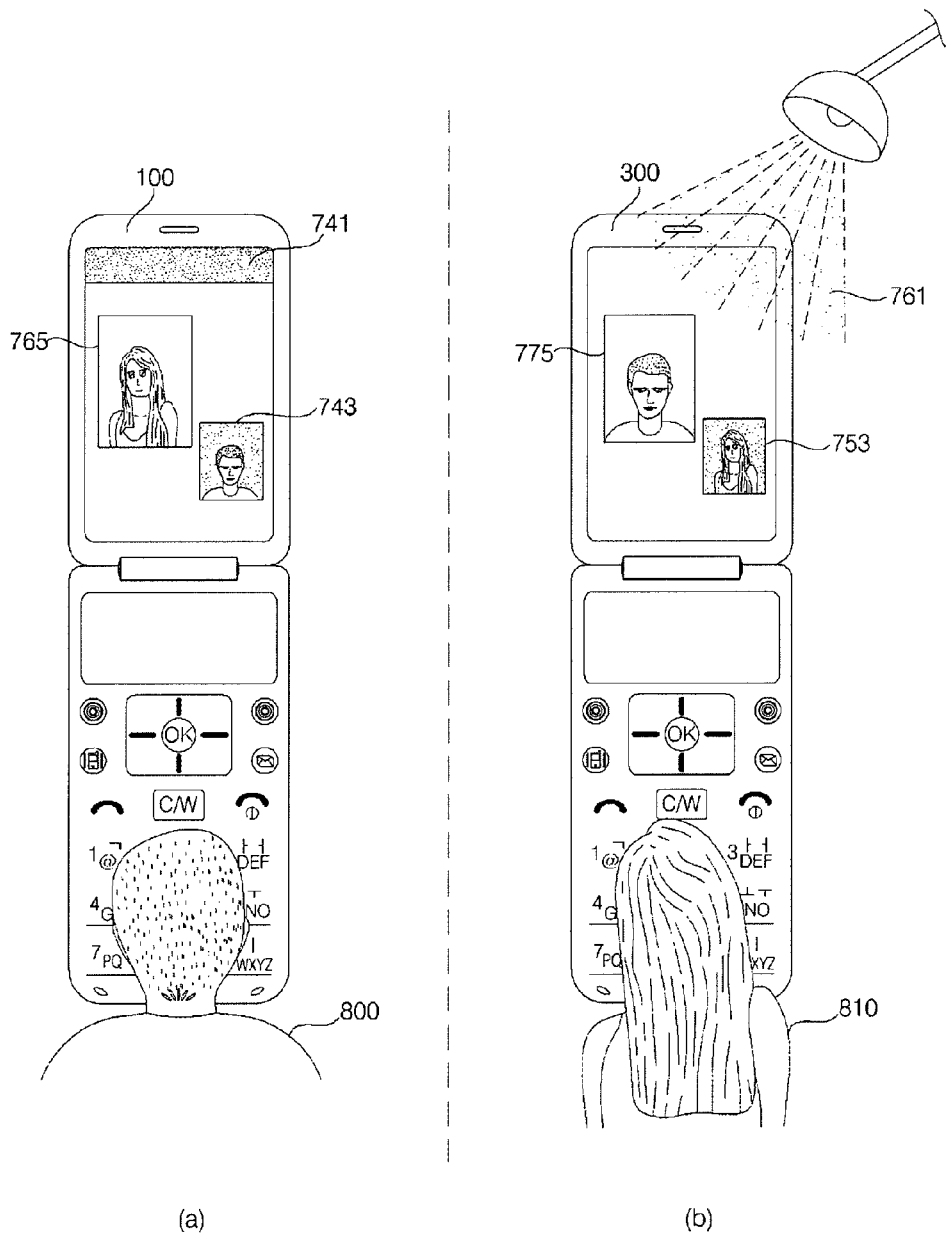
FIG. 28 illustrates a diagram for explaining how to correct or adjust an image based on color temperature provided by a counterpart mobile terminal and transmit the corrected or adjusted image to the counterpart mobile terminal.

FIG. 28 illustrates a diagram for explaining how to correct a voice call image based on color temperature information provided by a counterpart mobile terminal and transmit the corrected image to the counterpart mobile terminal. Referring to FIG. 28, during a video call between a user 800 of the mobile terminal 100 who is under natural light and a user 810 of a mobile terminal 720 who is under red light 761, a video call image 743 of the user 800 and a video call image 765 of the user 810 may be displayed on the screen of the mobile terminal 100, and a video call image 753 of the user 810 and a video call image 775 of the user 800 may be displayed on the screen of the mobile terminal 720.

When a video call is connected between the mobile terminal 100 and the mobile terminal 720, the second mobile terminal 720 may measure the color temperature of its ambient lighting with the use of a color sensor, may generate CCT information based on the results of the measurement and may transmit the CCT information to the mobile terminal 100. Then, the mobile terminal 100 may correct the user 800's video call image based on the CCT information provided by the mobile terminal 720. That is, the mobile terminal 100 may correct the white balance of the user 800's video call image to the mobile terminal 720 so that the user 800's video call image can appear to be as natural as possible under the red light 761. Since red features and details in the user 800's video call image can be accentuated under the red light 761, the mobile terminal 100 may reduce the amount of red in the user 800's video call image and may increase the amount of blue in the user 800's video call image, and may transmit the corrected video call image to the mobile terminal 720. The mobile terminal 100 may not necessarily have to correct the user 800's video call image based on the CCT information provided by the mobile terminal 720.

If the CCT information provided by the mobile terminal 720 includes not only ambient CCT information but also display CCT information, the mobile terminal 100 may correct the user 800's video call image based on both the ambient CCT information and the display CCT information.

The mobile terminal 100 may emit light having the same color temperature as that of the ambient lighting of the mobile terminal 720 based on the CCT information provided by the mobile terminal 720. That is, during a video call with the mobile terminal 720, the mobile terminal 100 may emit light having the same color temperature as or a similar color temperature to that of the red light 761. As a result, the user 800 may feel as if sharing the same atmosphere and space with the user 810.

The mobile terminal 620 may also correct the user 810's video call image based on CCT information provided by the mobile terminal 100. In this instance, if the mobile terminal 100 transmits CCT information regarding natural light to the mobile terminal 720, the mobile terminal 720 may correct the user 810's video call image based on the CCT information regarding natural light, and may transmit the corrected video call image to the mobile terminal 100. That is, since the user 810's video call image is generated under the red light 761, the user 810's video call image may appear to be redder than it actually is when viewed under natural light. In order to address this problem, the mobile terminal 720 may correct the white balance of the user 810's video call image so that the user 810's video call image can appear to be natural under natural light. For this reason, the video call images 753 and 765 may have different white balance levels even though they are of the same user.

The mobile terminal according to the present invention and the method of controlling the operation of a mobile terminal according to the present invention are not restricted to the example embodiments set forth herein. Therefore, variations and combinations of the example embodiments set forth herein may fall within the scope of the present invention.

Embodiments of the present invention may be performed using Application software, also known as an application, as computer software designed to help the user to perform singular or multiple related specific tasks.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, a lighting module may be disposed along the sides of a display module or a keypad, and may be driven to emit light having a color determined based on color data generated by a color sensor. Therefore, it is possible to change the color of a mobile terminal into a variety of colors in accordance with a user's preferences and the surroundings of the mobile terminal.

According to the present invention, it is possible to change the color of a mobile terminal into a color that can be easily distinguished from the surroundings of the mobile terminal and thus to help the user locate the mobile terminal with ease.

According to the present invention, since it is possible to provide color information of the surroundings of a mobile terminal as, for example, audio data, it is possible to help the user perceive colors from his or her surroundings with the use of a mobile terminal. In addition, it is possible to easily detect even a slightest crack or impurities in an object simply by using a color sensor of a mobile terminal.

According to the present invention, color information acquired from the surroundings of a mobile terminal can be transmitted to another mobile terminal. In this manner, it is possible to determine the state and location of a mobile terminal based on color information provided by the mobile terminal. In addition, during a video call between two mobile terminals, it is possible for the users of the two mobile terminals to feel as if sharing the same atmosphere and space.

According to the present invention, it is possible to correct a captured image or an image displayed on a display module of a mobile terminal based on color data provided by a color sensor.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. A method of controlling an operation of a mobile terminal, the method comprising:
    performing color sensing of a first color using a color sensor of the mobile terminal and recognizing a second color which corresponds to the first color; and
    providing an output based on the second color,
    wherein the performing of the color sensing includes:
    generating color data corresponding to an ambient color of a surrounding of a main body of the mobile terminal, the ambient color being the first color; and
    determining an output color based on the color data, the output color being the second color, and
    wherein the providing of the output includes driving a lighting module of the mobile terminal to emit light of the second color.

2. The method of claim 1, further comprising, if the output color based on the color data is one that cannot be emitted by the lighting module, determining the output color based on color data stored in the mobile terminal.

3. The method of claim 1, wherein the color data includes correlated color temperature (CCT) data.

4. A method of controlling an operation of a mobile terminal, the method comprising:
    performing color sensing of a first color using a color sensor of the mobile terminal and recognizing a second color which corresponds to the first color; and
    providing an output based on the second color,
    wherein the performing of the color sensing includes:
    sensing an ambient color of a surrounding of a main body of the mobile terminal, the ambient color being the first color; and
    determining a color having a color difference greater than a reference level from the ambient color as an output color, the output color being the second color, and
    wherein the providing of the output includes driving a lighting module of the mobile terminal to emit light of the second color.

5. The method of claim 4, wherein the output color is a complementary color of the ambient color.

6. The method of claim 4, further comprising correcting an image captured by a camera of the mobile terminal in accordance with the ambient color.

7. A method of controlling an operation of a mobile terminal, the method comprising:
    performing color sensing of a first color using a color sensor of the mobile terminal and recognizing a second color which corresponds to the first color;
    providing an output based on the second color; and
    connecting a video call to a counterpart mobile terminal,
    wherein the performing of the color sensing includes sensing a skin tone of a user, the skin tone being the first color, comparing the sensed skin tone with a reference skin tone and generating a skin tone-corrected video call image of the user in which the skin tone of the user is corrected in accordance with the results of the comparison, the corrected skin tone being the second color, and
    wherein the providing of the output includes transmitting the skin tone-corrected video call image to the counterpart mobile terminal during the video call with the counterpart mobile terminal.

8. A method of controlling an operation of a mobile terminal, the method comprising:
    performing color sensing of a first color using a color sensor of the mobile terminal and recognizing a second color which corresponds to the first color;

providing an output based on the second color; and
generating an input image by capturing an image of a subject using a camera of the mobile terminal,
wherein the performing of the color sensing includes detecting a color from the input image, the color being the first color, and
wherein the providing of the output includes generating an audio signal indicating the first color and outputting the audio signal.

9. A mobile terminal, comprising:
a main body;
a color sensor configured to perform color sensing of a first color;
a controller configured to recognize a second color which corresponds to the first color; and
an output unit configured to provide an output that is based on the second color,
wherein the color sensor is further configured to generate color data corresponding to an ambient color of a surrounding of a main body of the mobile terminal, the ambient color being the first color,
the controller is further configured to determine an output color based on the color data, the output color being the second color, and
the output unit includes a lighting module configured to emit light of the second color.

10. The mobile terminal of claim 9, further comprising a display module configured to display an operation screen, wherein the lighting module is disposed along the sides of the display module.

11. The mobile terminal of claim 9, further comprising a user input unit configured to receive a user command, wherein the lighting module is disposed along the sides of the user input unit.

12. A mobile terminal, comprising:
a main body;
a color sensor configured to perform color sensing of a first color;
a controller configured to recognize a second color which corresponds to the first color; and
an output unit configured to provide an output that is based on the second color,
wherein the color sensor is further configured to sense an ambient color of a surrounding of a main body of the mobile terminal, the ambient color being the first color,
the controller is further configured to determine a color having a color difference greater than a reference level from the ambient color as an output color, the output color being the second color, and
the output unit includes a lighting module configured to emit light of the second color.

13. A mobile terminal, comprising:
a main body;
a color sensor configured to perform color sensing of a first color;
a controller configured to recognize a second color which corresponds to the first color;
an output unit configured to provide an output that is based on the second color; and
a wireless communication unit configured to connect a video call to a counterpart mobile terminal,
wherein the color sensor is further configured to sense a skin tone of a user, the skin tone being the first color,
the controller is further configured to compare the sensed skin tone with a reference skin tone and generate a skin tone-corrected video call image of the user in which the skin tone of the user is corrected in accordance with the results of the comparison, the corrected skin tone being the second color, and
the output unit is configured to transmit the skin tone-corrected video call image to the counterpart mobile terminal during the video call with the counterpart mobile terminal.

14. A mobile terminal, comprising:
a main body;
a color sensor configured to perform color sensing of a first color;
a controller configured to recognize a second color which corresponds to the first color;
an output unit configured to provide an output that is based on the second color; and
a camera configured to generate an input image by capturing an image of a subject,
wherein the color sensor detects a color from the input image, the color being the first color, and
the output unit generates an audio signal indicating the first color and outputs the audio signal.

15. A mobile terminal, comprising:
a main body;
a color sensor configured to perform color sensing of a first color;
a controller configured to recognize a second color which corresponds to the first color;
an output unit configured to provide an output that is based on the second color; and
a wireless communication unit configured to connect a video call to a counterpart mobile terminal, to receive ambient lighting information from the counterpart mobile terminal, and to transmit a video call image to the counterpart mobile terminal,
wherein the controller controls adjusting of an output of the mobile terminal based on the received ambient lighting information.

16. The mobile terminal of claim 15, further comprising a display module configured to display a communication window showing in real time data currently being transmitted between the mobile terminal and the counterpart mobile terminal,
wherein the controller is further configured to change a color of the communication window based on the ambient lighting information.

17. The mobile terminal of claim 16, wherein the ambient lighting information includes CCT information, which is generated by a color sensor of the counterpart mobile terminal.

18. The mobile terminal of claim 16, wherein the controller is further configured to correct the video call image based on CCT information included in the ambient lighting information provided by the counterpart mobile terminal and control the wireless communication unit to transmit the corrected video call image to the counterpart mobile terminal during the video call with the counterpart mobile terminal.

* * * * *